US012625452B2

(12) United States Patent
Kyotani et al.

(10) Patent No.: US 12,625,452 B2
(45) Date of Patent: May 12, 2026

(54) IMAGE FORMING APPARATUS CONFIGURED TO PERFORM INITIALIZATION PROCESS TO INITIALIZE LIFETIME INFORMATION IN CONSUMABLE MEMORY OF CONSUMABLE WHEN RECEIVING INSTRUCTION

(71) Applicant: BROTHER KOGYO KABUSHIKI KAISHA, Nagoya (JP)

(72) Inventors: Tadao Kyotani, Nagoya (JP); Yosuke Imanishi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/358,106

(22) Filed: Jul. 25, 2023

(65) Prior Publication Data

US 2023/0367250 A1 Nov. 16, 2023

Related U.S. Application Data

(63) Continuation of application No. PCT/JP2022/003262, filed on Jan. 28, 2022.

(30) Foreign Application Priority Data

Jan. 29, 2021 (JP) ................................ 2021-013957
Jan. 29, 2021 (JP) ................................ 2021-013958

(51) Int. Cl.
*G03G 15/08* (2006.01)
*B41J 2/175* (2006.01)
(Continued)

(52) U.S. Cl.
CPC ........ *G03G 15/553* (2013.01); *B41J 2/17546* (2013.01); *G03G 15/0863* (2013.01);
(Continued)

(58) Field of Classification Search
CPC ............... G03G 15/553; G03G 15/556; G03G 15/0863; G03G 21/1875; G03G 21/1878;
(Continued)

(56) References Cited

U.S. PATENT DOCUMENTS 5,860,363 A 1/1999 Childers et al.
6,173,128 B1 * 1/2001 Saber .................. G03G 21/181
399/24
(Continued)

FOREIGN PATENT DOCUMENTS

CN 1713085 A 12/2005
CN 1885185 A 12/2006
(Continued)

OTHER PUBLICATIONS

International Preliminary Report on Patentability issued in the corresponding International Patent Application No. PCT/JP2022/003262, Jul. 31, 2023.

(Continued)

*Primary Examiner* — Robert B Beatty
(74) *Attorney, Agent, or Firm* — Merchant & Gould P.C.

(57) ABSTRACT

An image forming apparatus includes: a main casing to which a consumable is attached; a controller; and a main memory. The consumable includes a consumable memory in which lifetime information relating to a service life of the consumable is stored. The controller is configured to perform: a reception process to receive an instruction to initialize the lifetime information; an initialization process to initialize the lifetime information stored in the consumable memory in accordance with the received instruction; and a write process to write initialization information into the consumable memory, the initialization information indicating that the lifetime information was initialized.

38 Claims, 21 Drawing Sheets

(51) Int. Cl.
*G03G 15/00* (2006.01)
*G03G 21/18* (2006.01)

(52) U.S. Cl.
CPC ..... *G03G 15/5016* (2013.01); *G03G 21/1878* (2013.01); *G03G 21/1889* (2013.01); *G03G 2215/0697* (2013.01); *G03G 2221/1823* (2013.01)

(58) Field of Classification Search
CPC ....... G03G 21/1889; G03G 2215/0695; G03G 2215/0697; G03G 2221/1663; G03G 2221/1838; G03G 2221/1823; G03G 15/5016; B41J 2/17506; B41J 2/17546; B41J 2/17566; G06F 3/1218; G06F 3/1219; G06F 3/1229; G06K 15/4075
USPC ................................................ 399/24, 25, 27
See application file for complete search history.

(56) References Cited

U.S. PATENT DOCUMENTS

| | | | | |
|---|---|---|---|---|
| 6,351,621 | B1 * | 2/2002 | Richards | B41J 2/17503 399/25 |
| 7,589,850 | B2 * | 9/2009 | Adkins | G06F 21/84 358/1.14 |
| 9,904,227 | B2 | 2/2018 | Kanakubo | |
| 2002/0108052 | A1 * | 8/2002 | Maruyama | B41J 2/04536 713/193 |
| 2003/0170038 | A1 * | 9/2003 | Ito | G03G 21/1889 399/24 |
| 2003/0228163 | A1 | 12/2003 | Yokoi et al. | |
| 2005/0078969 | A1 * | 4/2005 | Kikuchi | G03G 21/1892 399/12 |
| 2005/0254833 | A1 | 11/2005 | Yokoe | |
| 2005/0254835 | A1 * | 11/2005 | Takei | G03G 15/0894 399/82 |
| 2005/0279821 | A1 | 12/2005 | Otsuka et al. | |
| 2006/0285859 | A1 * | 12/2006 | Cook | G03G 21/1889 399/24 |
| 2006/0294415 | A1 | 12/2006 | Kawai et al. | |
| 2007/0071459 | A1 | 3/2007 | Nakazato | |
| 2007/0140743 | A1 | 6/2007 | Kamimura | |
| 2009/0034995 | A1 | 2/2009 | Mochizuki | |
| 2009/0213417 | A1 | 8/2009 | Ishikura | |
| 2010/0202788 | A1 * | 8/2010 | Suda | G03G 15/0855 399/27 |
| 2013/0142524 | A1 | 6/2013 | Kim et al. | |
| 2016/0291521 | A1 * | 10/2016 | Nagata | G03G 15/0863 |
| 2016/0349665 | A1 * | 12/2016 | Takahashi | G03G 15/0863 |
| 2018/0275583 | A1 | 9/2018 | Kawai | |
| 2020/0234095 | A1 | 7/2020 | Nakane | |
| 2022/0009241 | A1 | 1/2022 | Azechi et al. | |

FOREIGN PATENT DOCUMENTS

| | | | |
|---|---|---|---|
| CN | 101515128 | A | 8/2009 |
| CN | 108628135 | A | 10/2018 |
| CN | 111845089 | A | 10/2020 |
| CN | 112192961 | A | 1/2021 |
| JP | 10-133528 | A | 5/1998 |
| JP | 10-202900 | A | 8/1998 |
| JP | 2001-215779 | A | 8/2001 |
| JP | 2003-241584 | A | 8/2003 |
| JP | 2005-326732 | A | 11/2005 |
| JP | 2007-3683 | A | 1/2007 |
| JP | 2007-93931 | A | 4/2007 |
| JP | 2007-94003 | A | 4/2007 |
| JP | 2009-037167 | A | 2/2009 |
| JP | 2015-143760 | A | 8/2015 |
| JP | 2019-179391 | A | 10/2019 |
| JP | 2020-118716 | A | 8/2020 |
| JP | 2020-163595 | A | 10/2020 |

OTHER PUBLICATIONS

International Search Report issued in related International patent application No. PCT/JP2022/003262, Mar. 22, 2022.
Extended European Search Report issued in corresponding European application No. 22746022.7, Nov. 22, 2024.

* cited by examiner

FIG. 4

| CARTRIDGE ID | RECYCLE NUMBER |
|---|---|
| TON0001 | 1 |
| DRM0056 | 1 |
| TON0001 | 2 |
| : | : |

IMAGE FORMING APPARATUS CONFIGURED TO PERFORM INITIALIZATION PROCESS TO INITIALIZE LIFETIME INFORMATION IN CONSUMABLE MEMORY OF CONSUMABLE WHEN RECEIVING INSTRUCTION

REFERENCE TO RELATED APPLICATIONS

This is a by-pass continuation application of International Application No. PCT/JP2022/003262 filed Jan. 28, 2022 which claims priorities from Japanese Patent Application No. 2021-013957 filed Jan. 29, 2021 and Japanese Patent Application No. 2021-013958 filed Jan. 29, 2021. The entire contents of the International Application and the priority applications are incorporated herein by reference.

BACKGROUND ART

Consumables such as a toner cartridge, a drum cartridge, and an ink cartridge, for example, are attached to image forming apparatuses. Each consumable includes a consumable memory. The consumable memory stores therein lifetime information relating to a service life of the consumable.

For example, a prior art discloses an ink cartridge at which a reset button for resetting contents of a memory mounted in the ink cartridge is provided. A user manually operates the reset button to reset the contents of the memory. The prior art discloses a technology that causes a printer to recognize that a cartridge is in a state that the cartridge is filled with ink by resetting a memory chip of the cartridge attached to the printer.

DESCRIPTION

In order to promote recycling of consumables, it is required that the user can simply initialize the consumable memory.

It is an object of the present disclosure to provide an image forming apparatus that can simply perform initialization of a consumable memory.

In order to attain the above and other object, according to one aspect, the present disclosure provides an image forming apparatus including: a main casing to which a consumable is attached; a controller; and a main memory. The consumable includes a consumable memory in which lifetime information relating to a service life of the consumable is stored. The controller is configured to perform: a reception process to receive an instruction to initialize the lifetime information; an initialization process to initialize the lifetime information stored in the consumable memory in accordance with the received instruction; and a write process to write initialization information into the consumable memory, the initialization information indicating that the lifetime information was initialized.

In the above structure, the controller initializes the lifetime information in the consumable memory when receiving an instruction to initialize the same. Accordingly, a user can perform simply initialization of the consumable memory using the image forming apparatus.

According to another aspect, the present disclosure also provides an initialization method of initializing a consumable memory included in a consumable. The initialization method includes: a reception step, by an image forming apparatus, receiving an instruction to initialize lifetime information stored in the consumable memory of the consumable attached to a main casing of the image forming apparatus, the lifetime information being information relating to a service life of the consumable; an initialization step, by the image forming apparatus, initializing the lifetime information stored in the consumable memory in accordance with the received instruction; and a write step, by the image forming apparatus, writing initialization information into the consumable memory, the initialization information indicating that the lifetime information was initialized.

The initialization method according to the above aspect exhibits the advantages the same as those obtained by the image forming apparatus according to the above-noted aspect.

According to still another aspect, the present disclosure also provides an image forming apparatus including: a main casing to which a cartridge is attached; a sensor; and a controller. The sensor measures a service life of a consumable filled in the cartridge. The cartridge includes a consumable memory in which lifetime information is stored. The lifetime information is information stored when the consumable is used and indicating the service life of the consumable. The controller is configured to perform: a permission process to permit initialization of the lifetime information by the image forming apparatus when the service life indicated by the lifetime information stored in the consumable memory is different from the service life measured by the sensor.

When the service life of the consumable in the cartridge actually measured and the service life on record are different from each other as indicated above, there is a likelihood that the cartridge is filled with the consumable again. That is, there is a likelihood that the cartridge is recycled. According to the above image forming apparatus, in a situation where there is a likelihood that the recycled cartridge is attached, the initialization of the lifetime information by the image forming apparatus is permitted. Accordingly, the initialization of the service life of the cartridge can be permitted in an appropriate situation.

According to still another aspect, the present disclosure also provides a control method for an image forming apparatus to which a cartridge filled with a consumable is attached. The cartridge includes a consumable memory in which lifetime information is stored. The lifetime information is information stored when the consumable is used and indicating a service life of the consumable. The control method includes: a permission step, by the image forming apparatus, permitting initialization of the lifetime information by the image forming apparatus when the service life indicated by the lifetime information is different from the service life measured by a sensor that measures the service life of the consumable; a selection screen display step, by the image forming apparatus, causing a display to display thereon an initialization selection screen when the initialization of the lifetime information is permitted, the initialization selection screen being a screen to select whether to perform the initialization of the lifetime information or not; and an initialization step, by the image forming apparatus, initializing the lifetime information when receiving an input operation indicating the initialization is to be performed through an operation part after the selection screen display step.

When the service life of the consumable in the cartridge actually measured and the service life on record are different from each other as indicated above, there is a likelihood that the cartridge is filled with the consumable again. That is, there is a likelihood that the cartridge is recycled. According to the above control method, in a situation where there is a likelihood that the recycled cartridge is attached, the image forming apparatus permits the initialization of the lifetime information in the permission step. In a state where the initialization of the lifetime information is permitted, the image forming apparatus causes the display to display thereon the initialization selection screen in order for the user to select whether to execute the initialization in the selection screen display step. Then, when the user inputs an input operation indicating that the initialization is to be executed, the image forming apparatus receives the input operation and initialize the lifetime information in the consumable memory in the initialization step. Accordingly, the image forming apparatus can permit the initialization of the service life of the cartridge in an appropriate situation.

FIG. 4 is a diagram illustrating one example of a data structure of use history information stored in a main memory.

FIRST EMBODIMENT

Hereinafter, a first embodiment of the present disclosure will be described while referring to the accompanying drawings. In one example, a case will be described where image forming apparatuses 1 are laser printers, and image formation is printing in the present embodiment. However, the image forming apparatuses 1 may be printers other than the laser printers. For example, the image forming apparatuses 1 may be inkjet printers.

<Overview of Image Formation System>

Figure 1:
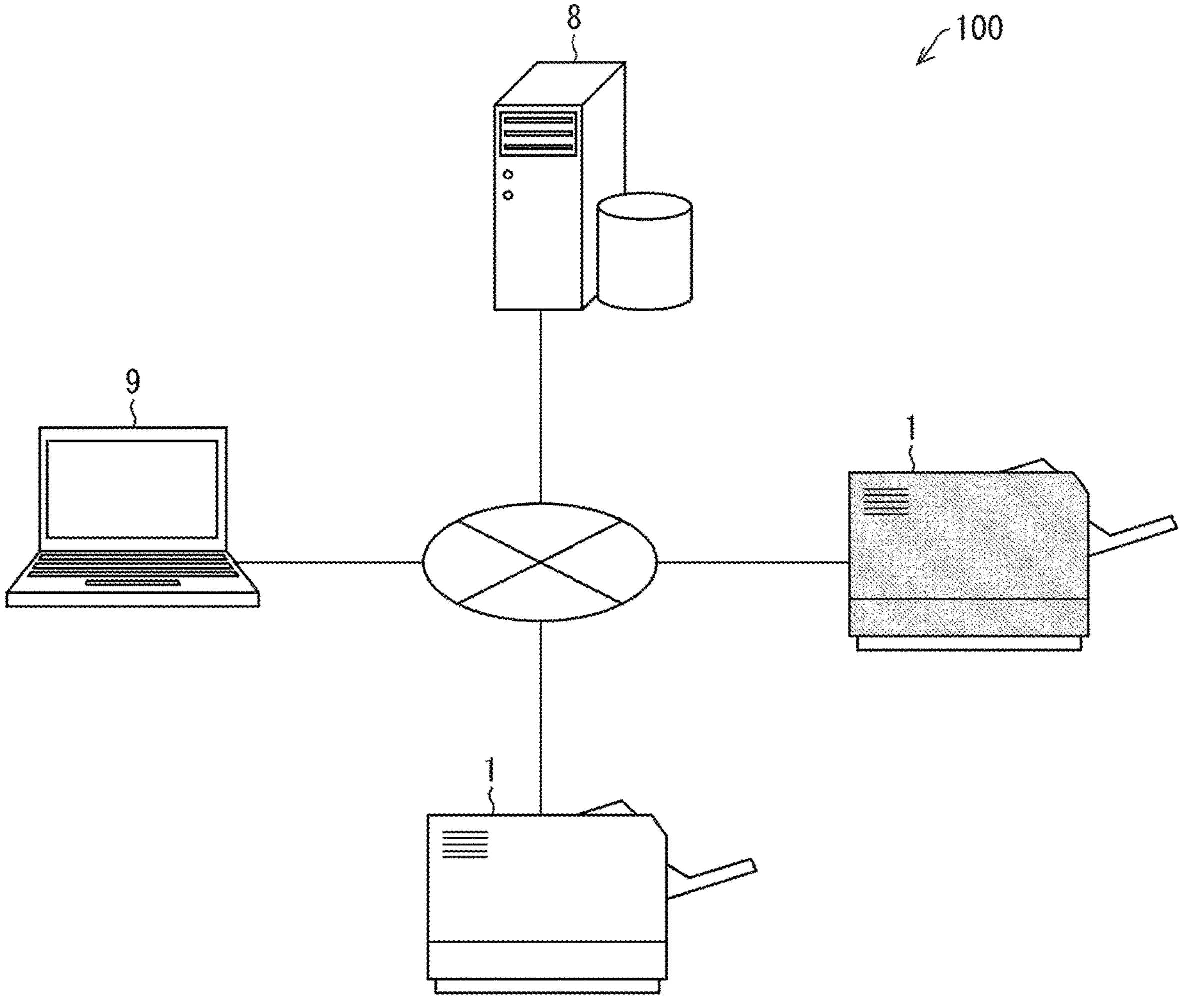
FIG. 1 is a diagram illustrating an overview of an image formation system.

FIG. 1 is a diagram illustrating an overview of an image formation system 100 according to the embodiment of the present disclosure. In the image formation system 100, based on an agreement concluded between a company and a user, the company provides the image forming apparatuses 1 of the user with a printing service. Hereinafter, a flat-rate printing service provided based on an agreement will be referred to as "subscription service", and printing that the image forming apparatus 1 performs using the provided subscription service will be referred to as "subscription printing" as distinguished from a normal printing performed independently of the agreement. The normal printing performed independently of the agreement will be hereinafter referred to as "normal printing".

As illustrated in FIG. 1, the image formation system 100 is configured by including a plurality of image forming apparatuses 1, a server 8, and a user terminal 9. Each image forming apparatus 1 used by the user functions as a device that performs the normal printing, and can function as a device that performs the subscription printing when use of the subscription service is permitted as will be described later. The server 8 used by the company is a device for managing the image forming apparatus 1 for which an agreement is concluded and which is permitted to use the subscription service. Hereinafter, the image forming apparatus 1 for which an agreement is concluded and which is permitted to use the subscription service will be referred to as "contracted machine". The user terminal 9 used by the user is a device that communicates with the server 8 in order to conclude and cancel an agreement and to perform other procedures. An information processing terminal equipped with standard communication functions, such as a PC (personal computer) or a smartphone, can be employed as the user terminal 9. The devices configuring the image formation system 100 can communicate with one another over a communication network such as the Internet.

The plurality of image forming apparatuses 1 illustrated in FIG. 1 may be image forming apparatuses purchased by the same user, or may be image forming apparatuses purchased by different users.

Each of the plurality of image forming apparatuses 1 is an image forming apparatus that can use consumables or replacements which are exclusively for an agreement by the user concluding the agreement with the company. In an example of the agreement, the company providing the subscription service and the user agree on a usage period, a usage fee, an upper limit number of sheets, and the like of the subscription service, and both parties agree that the company will provide this subscription service with the user. That is, the image forming apparatus 1 according to the present embodiment is an image forming apparatus that can perform the subscription printing which is printing based on details of the concluded agreement after the agreement for the subscription service is concluded.

In the subscription service that the company provides the user, the following (1) and (2) may be performed at different timings in the image formation system 100.

(1) The timing at which the server 8 recognizes the image forming apparatus 1 as the contracted machine for which an agreement is concluded.

(2) The timing at which the server 8 recognizes that the image forming apparatus 1 started use of the subscription service.

That is, in the subscription service, there may be a case in which the server 8 recognizes that "the image forming apparatus 1 is the contracted machine, but the use of the subscription service is not yet started".

Note that "the server 8 recognizes the image forming apparatus 1 as the contracted machine" in (1) may be performed to trigger that the image forming apparatus 1 shifts a state from a non-subscription mode indicating that an agreement is not concluded to a subscription mode indicating that an agreement is concluded.

Further, "recognize that the use of the subscription service started" just indicates that the server 8 recognizes that "the use of the subscription service started from a certain date and time". Therefore, the timing at which the server 8 recognizes that the use of the subscription service started need not coincide with the timing at which the image forming apparatus 1 actually performed the subscription printing.

Unless otherwise specified, the following description assumes that the subscription service is a paid service. The timing of (1) is a timing at which the server 8 recognizes the image forming apparatus 1 as the contracted machine, and does not serve as a trigger for starting billing. The timing of (2) is assumed to be a timing for starting billing.

As another example, the timing of (1) and the timing of (2) may be approximately simultaneous. For example, (1) and (2) described above may occur triggering that a cartridge (a consumable) which is exclusively for the subscription service and is used for the subscription printing is attached. Hereinafter, a cartridge which is exclusively for the subscription service and is used for the subscription printing will be referred to as "subscription cartridge". For example, the image forming apparatus 1 reads prescribed information from a cartridge memory of the attached subscription cartridge, and transmits the prescribed information to the server 8. When receiving the prescribed information from the image forming apparatus 1, the server 8 recognizes that the image forming apparatus 1 is the contracted machine and that the use of the subscription service started in the image forming apparatus 1.

Note that a display part such as a liquid crystal display or a lamp, and an operation part such as a button are provided at the image forming apparatus 1. The liquid crystal display may be integrally formed with a touch panel to function as the operation part.

<Overview of Structure of Image Forming Apparatuses 1>

Figure 2:
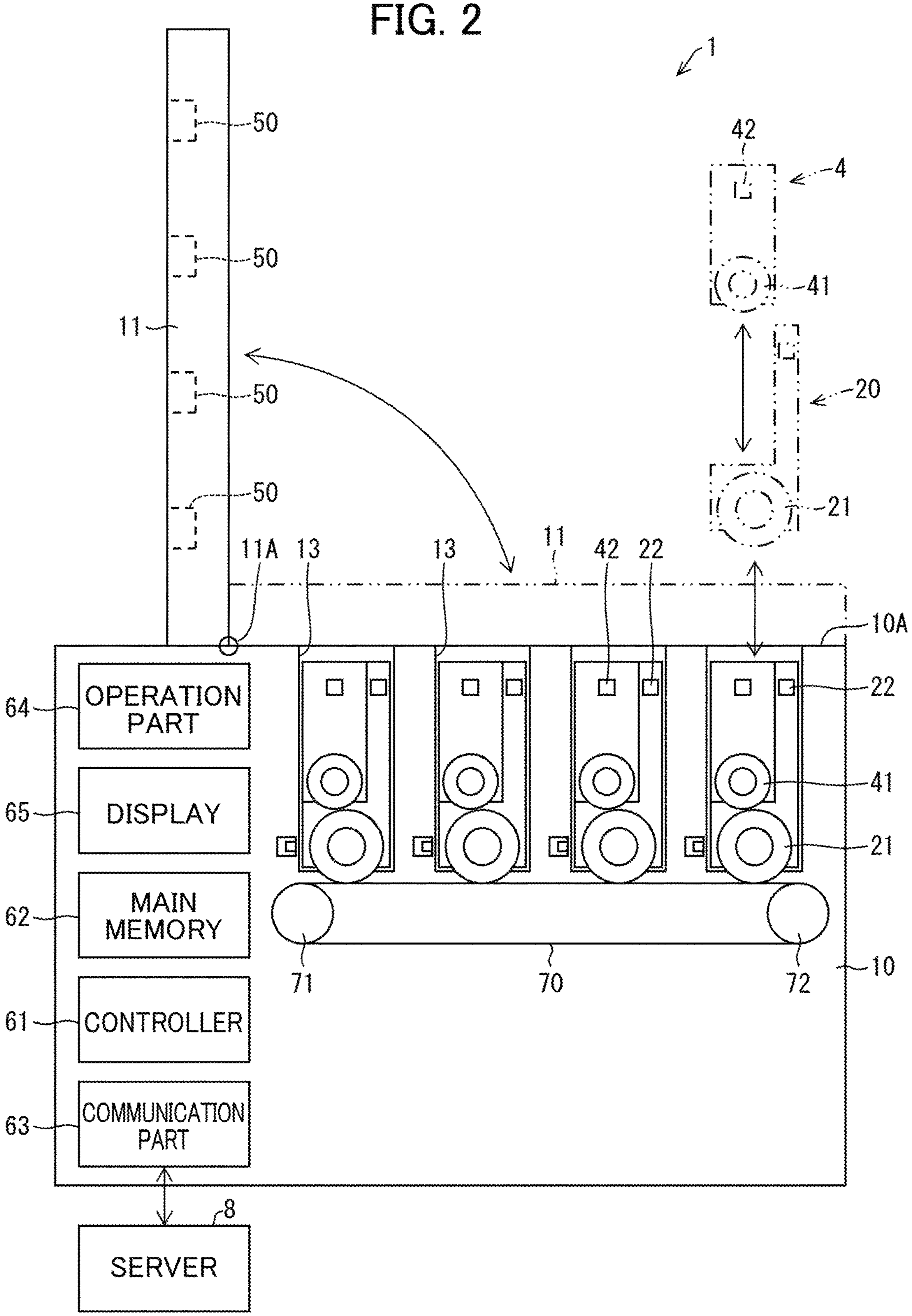
FIG. 2 is a schematic diagram of an image forming apparatus.
Figure 3:
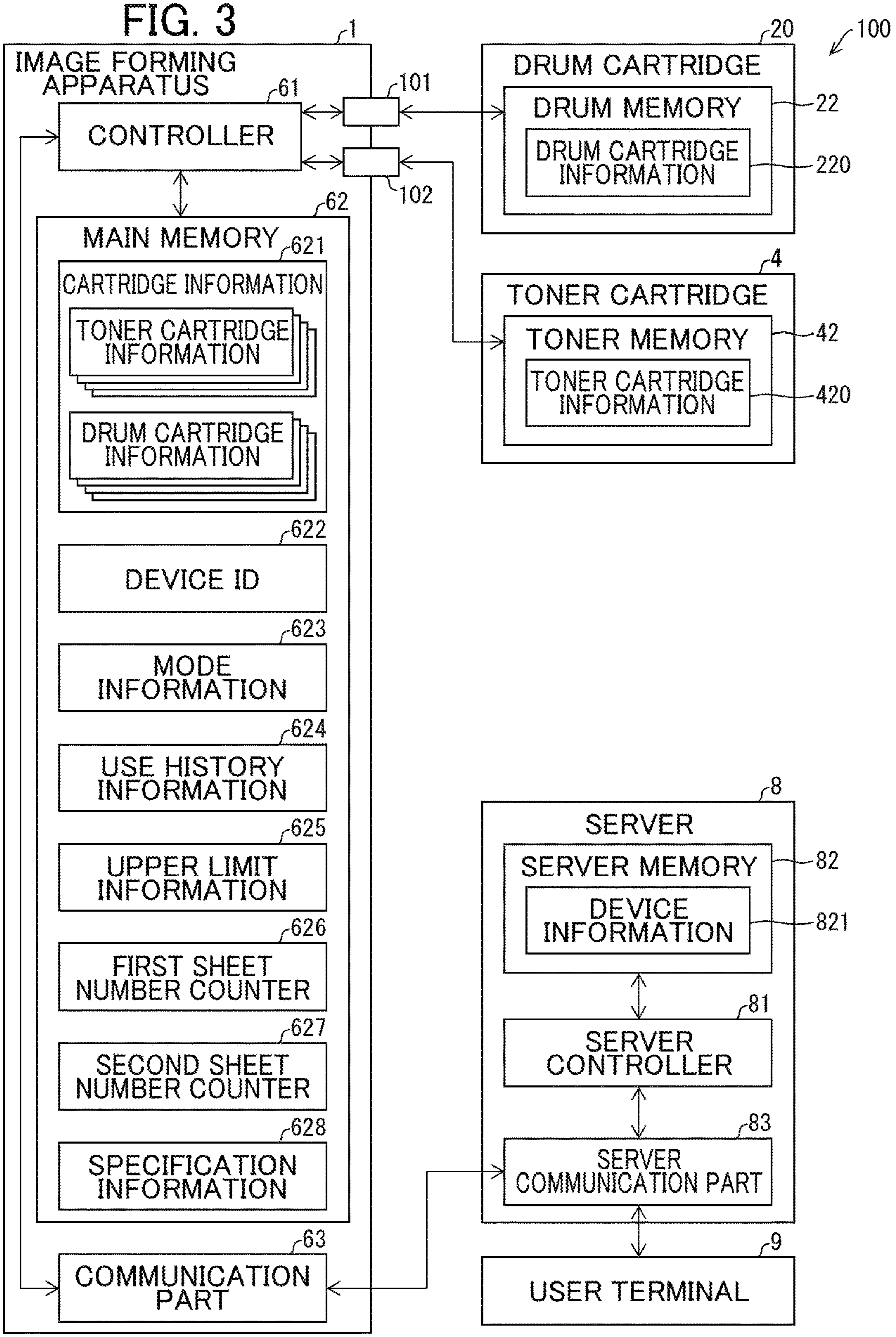
FIG. 3 is a diagram illustrating a structure of a main part of the image forming apparatus including drum cartridges and toner cartridges.

FIG. 2 is a schematic diagram of the image forming apparatus 1. FIG. 3 is a diagram illustrating internal structures of the image forming apparatus 1 including drum cartridges 20 and toner cartridges 4, and the server 8.

As illustrated in FIG. 2, the image forming apparatus 1 is configured of a main casing 10, and a cover 11. Although not illustrated in the drawings, a display part such as a liquid crystal display or a lamp, and an input part such as a button may be provided at the image forming apparatus 1. The liquid crystal display may be integrally formed with a touch panel to function as the operation part.

(Main Casing 10)

The toner cartridges 4 are attached to the main casing 10 of the image forming apparatus 1. As will be described later in detail, each toner cartridge 4 is attached to the drum cartridge 20 and is integrated therewith. That is, while attached to the drum cartridge 20, the toner cartridge 4 is attached together with the drum cartridge 20 to the main casing 10, thereby achieving the image forming apparatus 1 that includes the drum cartridge 20 and the toner cartridge 4.

Note that, in the image forming apparatus 1 according to the present embodiment, four toner cartridges 4 need to be attached in order to perform printing. In other words, four drum cartridges 20 and four toner cartridges 4 are attachable to the image forming apparatus 1 according to the present embodiment. However, the numbers of drum cartridges 20 and toner cartridges 4 attached to the image forming apparatus 1 are not limited to the example of FIG. 2. For example, the image forming apparatus 1 may be a monochromatic printer that allows attachment of a single drum cartridge 20 and a single toner cartridge 4.

Each toner cartridge 4 includes toner that is consumed when the image forming apparatus 1 performs printing. That is, the toner cartridge 4 is a consumable for the image forming apparatus 1. Further, each drum cartridge 20 includes a photosensitive drum 21 that is used when the image forming apparatus 1 performs printing. The drum cartridge 20 is also an example of the consumable for the image forming apparatus 1.

The main casing 10 has a rectangular box shape, for example. The main casing 10 accommodates therein the four drum cartridges 20, the four toner cartridges 4, a transfer belt 70, a controller 61, a main memory 62, a communication part 63, an operation part 64, and a display 65. Note that, in a case where the operation part 64 is a hardware button, a pressing surface of the operation part 64 may be provided at an outer surface of the main casing 10 so that the user can operate the pressing surface. Further, a display surface of the display 65 may be provided at the outer surface of the main casing 10 so that the user can visually recognize displayed information.

The main casing 10 has four cartridge retaining parts 13. Each cartridge retaining part 13 is formed as a recess and has an opening. The drum cartridge 20 and the toner cartridge 4 are retained in each cartridge retaining parts 13 to be attached to the main casing 10.

(Cover 11)

A light source unit 50 is provided corresponding to each drum cartridges 20 at the cover 11 of the image forming apparatus 1. That is, the image forming apparatus 1 includes four light source units 50. The cover 11 is pivotally movable (movable) about a pivot shaft 11A extending in a first direction between an open position indicated by a solid line in FIG. 2 in which the cover 11 opens an opening 10A and a closed position indicated by a two-dotted chain line in FIG. 2 in which the cover 11 closes the opening 10A. The opening 10A provided at an upper end of the main casing 10 is opened and closed in accordance with pivotal movement of the cover 11.

Note that the "first direction" indicates a direction in which a rotation center axis (a developing axis) of a developing roller of a toner cartridge extends. The respective openings of the cartridge retaining parts 13 are opened when the cover 11 is positioned at the open position, and the respective openings of the cartridge retaining parts 13 are covered with the cover 11 when the cover 11 is positioned at the closed position.

In the main casing 10, a closure sensor (not illustrated) may be provided at the opening 10A. The closure sensor is a sensor configured to detect that the cover 11 is at the closed position. The closure sensor may be a contact-type sensor or an optical-type sensor, for example.

(Toner Cartridge 4)

Each toner cartridge 4 includes a cartridge casing that can accommodate therein a developing roller 41 and developer (for example, toner) as an example of printing material. The cartridge casing is attachable to the main casing 10. The four toner cartridges 4 accommodate therein developer of colors different from one another (for example, colors of cyan, magenta, yellow, and black) as the material used for performing image formation. The developer is a material consumed during use. The developing roller 41 is a hollow cylindrical member extending in the first direction and is rotatable about its developing axis extending in the first direction. When the toner cartridge 4 is attached to the drum cartridge 20, an outer circumferential surface of the photosensitive drum 21 contacts an outer circumferential surface of the developing roller 41.

Also, each toner cartridge 4 includes a toner memory 42 (the consumable memory) as illustrated in FIG. 3. The toner memory 42 is positioned at an outer surface of the toner cartridge 4 at one side in the first direction. The toner memory 42 is a memory from which information is readable and to which information is writable. For example, the toner memory 42 is a flash ROM (Read Only Memory) or an EEPROM (Electronically Erasable and Programmable Read Only Memory). "EEPROM" is a registered Japanese trademark of Renesas Electronics Corporation.

The toner memory 42 stores therein toner cartridge information 420 which is information relating to the toner cartridge 4. A data structure of the toner cartridge information 420 will be described later with reference to FIG. 5.

(Drum Cartridge 20)

Each drum cartridge 20 includes a cartridge casing attachable to the main casing 10. The cartridge casing includes the photosensitive drum 21 as a component used for performing image formation. The photosensitive drum 21 is a replacement component that needs to be replaced since deterioration such as wear of the surface occurs during use. The photosensitive drum 21 is a hollow cylindrical photosensitive member extending in the first direction. The photosensitive drum 21 is rotatable about its drum axis extending in the first direction. The outer circumferential surface of the photosensitive drum 21 is coated with a photosensitive material.

Each drum cartridge 20 may include a drum memory 22 (the consumable memory). The drum memory 22 is a memory from which information is readable and to which information is writable. For example, the drum memory 22 is a flash ROM or an EEPROM.

As illustrated in FIG. 3, the drum memory 22 stores therein drum cartridge information 220 which is information relating to the drum cartridge 20. A data structure of the drum cartridge information 220 will be described later with reference to FIG. 6.

<Attachment of Cartridge and Printing Mechanism>

As illustrated in FIG. 2, the drum cartridge 20 and the toner cartridge 4 are attached to the main casing 10 in a state where the cover 11 is positioned at the open position. In this state, the drum cartridge 20 and the toner cartridge 4 are inserted into the cartridge retaining part 13 through the opening 10A.

The four light source units 50 are attached to an inner surface of the cover 11. Each light source unit 50 is disposed so as to face the surface of the photosensitive drum 21 in a state where the drum cartridge 20 is attached to the main casing 10 and the cover 11 is at the closed position. Each light source unit 50 has a plurality of light sources arranged in the first direction. Each light source can emit light to the outer circumferential surface of the photosensitive drum 21. Each light source is an LED (Light Emitting Diode), for example.

The light source unit 50 is electrically connected to the controller 61. The controller 61 causes the plurality of light sources of the light source unit 50 to emit light in accordance with inputted image data. Each light source emits light toward the outer circumferential surface of the photosensitive drum 21. As a result, the photosensitive material on the outer circumferential surface of the photosensitive drum 21 is exposed to light in accordance with the image data.

The transfer belt 70 is a component that transfers developer (for example, toner) carried on the surface of the photosensitive drum 21 onto printing paper. The transfer belt 70 is a replacement component that needs to be replaced since deterioration such as wear of a surface occurs during use. The transfer belt 70 is a belt having an annular shape (an endless belt) that can contact each photosensitive drum 21. The outer circumferential surface of each photosensitive drum 21 can contact an outer peripheral surface of the transfer belt 70. During a printing process, printing paper is conveyed between the transfer belt 70 and each photosensitive drum 21.

The transfer belt 70 is looped over a drive roller 71 and a follower roller 72. The drive roller 71 drives the transfer belt 70. The controller 61 causes the drive roller 71 to rotate. The follower roller 72 rotates following movement of the transfer belt 70 in accordance with drive of the drive roller 71.

<Internal Structure of Main Casing>

The controller 61 includes an ASIC (Application Specific Integrated Circuit), for example. The controller 61 is electrically connected to the main memory 62 and the communication part 63 provided in the main casing 10 of the image forming apparatus 1. Although not illustrated in FIG. 3, the operation part 64 and the display 65 are also electrically connected to the controller 61. The controller 61 executes various operations to cause the image forming apparatus 1 to execute various processes relating to printing.

The controller 61 may include a processor such as a CPU (Central Processing Unit). In this case, a control program for implementing a method of controlling the image forming apparatus may be stored in the main memory 62, and the controller 61 may cause the image forming apparatus 1 to execute various processes by the processor operating according to the control program.

The controller 61 may include a computer-readable storage medium that stores therein the control program such as the main memory 62. A "non-transitory tangible medium" such as a ROM, a tape, a disc, a card, a semiconductor memory, or a programmable logic circuit can be used as the storage medium. Further, a RAM (Random Access Memory) or the like for developing the control program may be employed. The control program may be supplied to the computer via any transmission medium (a communication network, broadcast waves, etc.) capable of transmitting the control program. Note that, according to one aspect of the present disclosure, the control program can be implemented in the form of data signals embedded in a carrier wave embodied in electronic transmission.

As illustrated in FIG. 3, the image forming apparatus 1 includes a connector 101 and a connector 102. As the connector 101 is electrically connected to the drum memory 22 in a state where the drum cartridge 20 is inserted into the cartridge retaining part 13 illustrated in FIG. 2, the controller 61 can communicate with the drum memory 22 of the drum cartridge 20. That is, the controller 61 can execute a process to read information from the drum memory 22 and a process to write (including a process to rewrite) information to the drum memory 22.

Further, as the connector 102 is electrically connected to the toner memory 42 in a state where the toner cartridge 4 is attached to the main casing 10, the controller 61 can communicate with the toner memory 42 of the toner cartridge 4. That is, the controller 61 can execute a process to read information from the toner memory 42 and a process to write (including a process to rewrite) information to the toner memory 42.

The main memory 62 is a memory from which information is readable and to which information is writable. For example, the main memory 62 is a flash ROM or an EEPROM. The main memory 62 has one or more storage areas. In one example, various information described below is stored in the respective areas.

Cartridge information 621 is information relating to cartridges attached to the image forming apparatus 1. Specifically, the cartridge information 621 includes the toner cartridge information 420 read from the toner memories 42 of the toner cartridges 4 of respective colors in such a manner that the toner cartridge information 420 can be identified for each toner cartridge 4. Further, the cartridge information 621 includes the drum cartridge information 220 read from the drum memories 22 of the drum cartridges 20 in such a manner that the drum cartridge information 220 can be identified for each drum cartridge 20. The toner cartridge information 420 includes, for example, lifetime information relating to a service life of the toner cartridge 4. The drum cartridge information 220 includes, for example, lifetime information relating to a service life of the drum cartridge 20. Details of data structures of the toner cartridge information 420 and the drum cartridge information 220 which are stored as the cartridge information 621 will be described later with reference to FIGS. 5 and 6.

In the present embodiment, the cartridge information (the drum cartridge information 220 and the toner cartridge information 420) read from the memory of each cartridge is referred to so that the controller 61 can accurately determine a state of the cartridge. By accurately grasping the state of the cartridge, the controller 61 can properly initialize the cartridge information in order for the cartridge to be properly recycled.

In the following description, "recycling the cartridge" indicates that the cartridge is restored to a state suitable for printing by performing replacement or replenishment only for a component that needs to be replaced among the constituent elements of the cartridge. That is, recycling of the cartridge includes not only replenishment of a consumed material, but also replacement of a deteriorated component with a new one. Hereinafter, a cartridge (a consumable) recycled by replenishment of a material or replacement of a component will be referred to as "recycled cartridge (a recycled product)".

A device ID 622 is identification information for identifying the image forming apparatus 1. The device ID 622 is a serial number of the image forming apparatus, for example.

Mode information 623 is information indicating an operation mode of the image forming apparatus 1. For example, in the present embodiment, two modes of "subscription mode" and "non-subscription mode" are defined. The "subscription mode" indicates that the image forming apparatus 1 operates on the image formation system 100 as a contracted machine for which an agreement is concluded. The "non-subscription mode" indicates that the image forming apparatus 1 is not the contracted machine and operates as a normal image forming apparatus for which an agreement is not concluded.

At the time of shipment of the image forming apparatus 1, the mode information 623 indicating a value corresponding to the non-subscription mode is stored by default in the main memory 62. The server 8 transmits, to the image forming apparatus 1 of the user who concluded an agreement, a request including an agreement shift instruction instructing the image forming apparatus 1 to shift to the subscription mode. In response to the request from the server 8, the controller 61 changes the mode information 623 from the non-subscription mode to the subscription mode. In one example, in the present embodiment, such an operation that the controller 61 changes the value of the mode information 623 from the non-subscription mode to the subscription mode in this way will be referred to as "shift to the subscription mode".

Use history information 624 is information indicating a history of using the recycled cartridge in the image forming apparatus 1. In one example, the use history information 624 may be information indicating the number of recycled cartridges that have been attached to the image forming apparatus 1. In another example, the use history information 624 may be a table retaining a combination of a cartridge ID of the recycled cartridge and a recycle number. In still another example, the use history information 624 may be a flag indicating whether a recycled cartridge has been attached even once or has never been attached.

FIG. 4 is a diagram illustrating one example of a data structure of the use history information 624 in the form of the table described above. The cartridge ID is identification information for uniquely identifying the recycled cartridge that have been attached to the image forming apparatus 1. The recycle number is information indicating the number of times that the attached recycled cartridge was recycled at a point of time the recycled cartridge is attached.

The controller 61 counts the number of recycled cartridges attached to the image forming apparatus 1 by referring to the use history information 624 illustrated in FIG. 4. At this time, the controller 61 can count the number of recycled cartridges while distinguishing not only the cartridge ID but also the recycle number. That is, for one cartridge having the identical cartridge ID, the controller 61 can perform counting while distinguishing attachment in which the recycle number is the first from attachment in which the recycle number is the second.

Upper limit information 625 is information indicating an upper limit of the number of times of recycling allowed for the cartridge. In the present embodiment, recycling of the cartridge that exceeds the upper limit of the number of times indicated by the upper limit information 625 is prohibited. For example, the controller 61 compares the recycle number of the cartridge with the upper limit information 625. As to the cartridge whose recycle number reaches the upper limit, the controller 61 can perform controlling so as not to perform initialization of the cartridge information for recycling.

A first sheet number counter 626 is the cumulative number of printed sheets in the image forming apparatus 1. A second sheet number counter 627 is the number of sheets printed in the image forming apparatus 1 using the subscription service. The second sheet number counter 627 may be reset to 0 each time the image forming apparatus 1 shifts from the non-subscription mode to the subscription mode, or may be the cumulative number of sheets printed in the image forming apparatus 1 using the subscription service to date. Hereinafter, unless otherwise specified, the second sheet number counter 627 is assumed to be the cumulative number of sheets printed as the subscription printing.

Specification information 628 is information indicating a specification of the image forming apparatus 1. For example, in the present embodiment, the image forming apparatus 1 and consumables therefor are manufactured with specifications adapted to the circumstances of countries where they are used. For example, there are three specifications of "for EU (Europe)", "for US (United States)", and "for JP (Japan)" for the image forming apparatus 1 and consumables therefor. The specification information 628 indicates one of the specifications described above.

In addition to the information described above, the main memory 62 may have an area for storing the cumulative number of printed sheets in the image forming apparatus 1, an area for storing an error state occurring in the image forming apparatus 1, and the like.

The communication part 63 conducts communication between the image forming apparatus 1 and the server 8 over a communication network such as the Internet. The communication part 63 outputs a request received from the server 8 to the controller 61. For example, the "request" indicates various requests, instructions, inquiries, and the like transmitted from the server 8 in a process executed related to an agreement. The communication part 63 returns a result calculated and outputted by the controller 61 in response to the above request to the server 8 as a "response". In the present embodiment, return of the "response" by the communication part 63 may be omitted. For example, when the request is an instruction to change various settings in the image forming apparatus 1, the controller 61 changes the various settings in the image forming apparatus 1 according to the received instruction. However, a response indicating that the various settings were changed need not be returned to the server 8 via the communication part 63.

<Structure of Server>

The server 8 includes a server communication part 83, a server memory 82, and a server controller 81 (a controller). The server communication part 83 is a communication interface that conducts communications between the server 8 and the image forming apparatus 1. The server communication part 83 transmits a request inputted from the server controller 81 to the image forming apparatus 1. The server communication part 83 receives a response transmitted from the image forming apparatus 1 in response to the transmitted request, and outputs the response to the server controller 81.

The server communication part 83 communicates with the user terminal 9 operated by the user of the image forming apparatus 1 over a communication network, and transmits and receives information to and from the user terminal 9. In the present embodiment, the server communication part 83 transmits and receives various information required for conclusion of an agreement to and from the user terminal 9.

The server memory 82 is a storage device that stores therein data required for an operation of the server 8. The server memory 82 stores therein device information 821 for each image forming apparatus 1 under the subscription service provided in the image formation system 100. The device information 821 may include, for example, a device ID, a subscription flag, a subscription upper limit number of printable sheets, a model number of the image forming apparatus 1, a date of manufacture of the image forming apparatus 1, and the like.

The device ID 622 is identification information for the server 8 to uniquely identify the image forming apparatus 1. The subscription flag is information indicating whether or not the image forming apparatus 1 shifted to the subscription mode, i.e., whether the image forming apparatus 1 is already recognized as the contracted machine. The subscription upper limit number of printable sheets indicates the upper limit of the number of sheets for which the image forming apparatus 1 can perform the subscription printing within a prescribed period of time determined in the agreement.

The server controller 81 is a CPU that performs overall control of the server 8. The server controller 81 generates a request for the image forming apparatus 1 at a prescribed timing, and outputs the generated request to the server communication part 83.

Further, on the basis of a response received from the image forming apparatus 1 via the server communication part 83, the server controller 81 newly stores the device information 821 in the server memory 82, and updates the device information 821 that is already stored in the server memory 82.

<Data Structure of Cartridge Information>

(Toner Cartridge Information)

Figure 5:
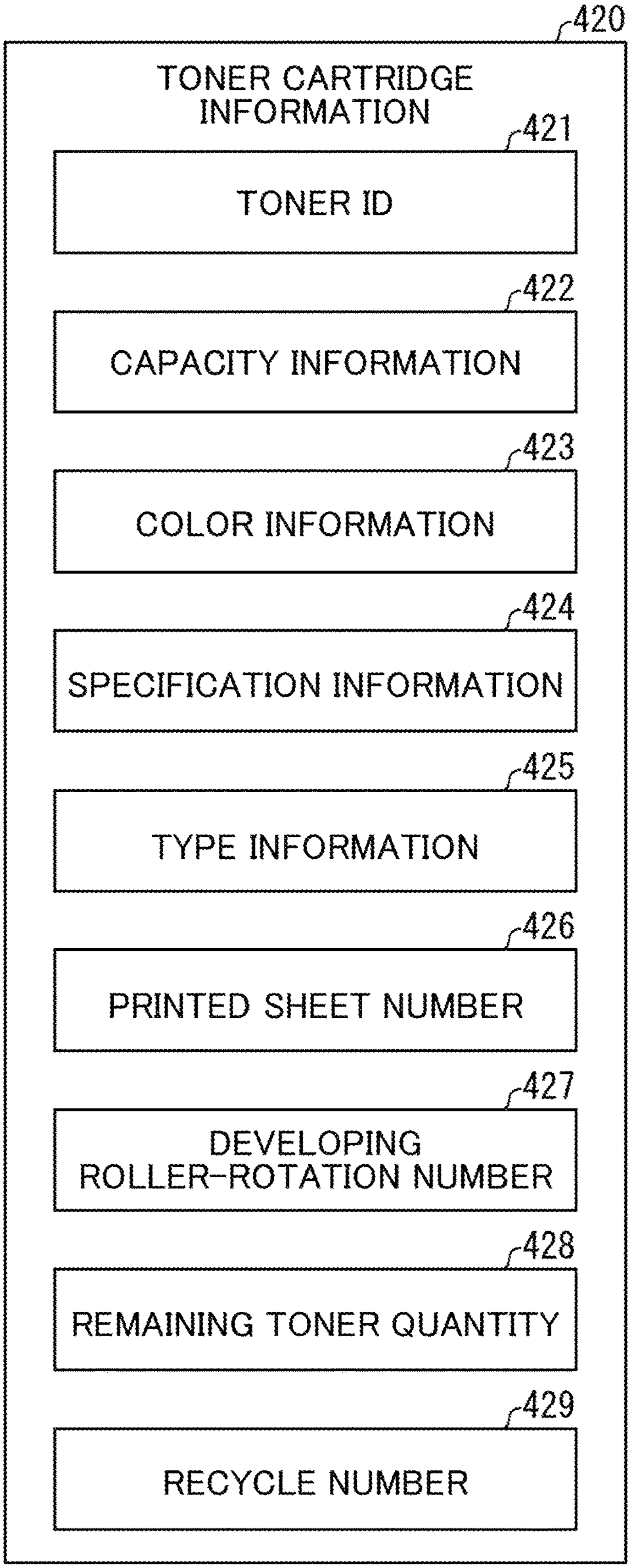
FIG. 5 is a diagram illustrating one example of a data structure of toner cartridge information stored in a toner memory.

FIG. 5 is a diagram illustrating one example of the data structure of the toner cartridge information 420 stored in the toner memory 42. The toner cartridge information 420 includes, for example, a toner ID 421, capacity information 422, color information 423, specification information 424, type information 425, lifetime information, and initialization information.

The lifetime information is information relating to a service life of a consumable. For example, the lifetime information includes at least one of: consumption information for identifying the degree to which the consumable is used; and remaining quantity information for identifying a quantity of a material remaining in the consumable. Although not limited thereto, a printed sheet number, a dot count, a printing material consumption quantity, a developing roller-rotation number, a drum-rotation number, and the like are examples of the consumption information, for example. Although not limited thereto, a remaining quantity of a printing material such as a remaining toner quantity, remaining ink quantity, and the like are examples of the remaining quantity information, for example.

The toner cartridge information 420 of the toner cartridge 4 includes, as examples of the lifetime information, a printed sheet number 426, a developing roller-rotation number 427, a remaining toner quantity 428 (the remaining printing material quantity), and the like. Alternatively, a dot count may be included as the lifetime information. The initialization information is information indicating whether or not at least a part of the information stored in the consumable memory was initialized according to the user's instruction, and is a recycle number 429, for example. The recycle number 429 indicates the number of times that the toner memory 42 was initialized for recycling.

The various information mentioned above are merely examples of the toner cartridge information 420. Any other information may be added, or a part of the various information described above may be appropriately omitted depending on the environment or the circumstance in which the image formation system 100 is constructed.

The toner ID 421 is identification information for uniquely identifying the toner cartridge 4. The toner ID 421 is a serial number unique to the toner cartridge 4, for example.

The capacity information 422 is information indicating a quantity of the printing material that the toner cartridge 4 can accommodate therein. For example, in the present embodiment, the capacity of the toner cartridge 4 can be set from four levels. More specifically, there are four levels of "small capacity", "standard capacity", "large capacity", and "extra-large capacity" in the ascending order as the capacity that can be set for the toner cartridge 4. The capacity information 422 indicates one of the capacities described above.

The color information 423 is information indicating the color of the printing material accommodated in the toner cartridge 4. In the present embodiment, there are four colors of "C (cyan)", "M (magenta)", "Y (yellow)", and "BK (black)" for the toner cartridge 4, for example. The color information 423 indicates one of the colors described above.

The specification information 424 is information indicating a specification of the toner cartridge 4. Similar to the main body of the image forming apparatus 1, there are three specifications of "for EU (Europe)", "for US (United States)", and "for JP (Japan)" for the toner cartridge 4. The specification information 424 indicates one of the specifications described above.

The type information 425 is information indicating a type of the toner cartridge 4. In the present embodiment, at least two types of "subscription" and "commercial" can be set as the type of the toner cartridge 4. The type information 425 indicates one of the two types described above.

The toner memory 42 of the subscription cartridge stores therein the type information 425 indicating the type "subscription". The image forming apparatus 1 can perform the subscription printing while the subscription cartridge is attached thereto. For example, the subscription cartridge is supplied from the company to the user who concluded an agreement for the image forming apparatus 1.

The toner memory 42 of the commercial toner cartridge 4 that can be purchased from electronics retail stores or online shopping websites stores therein the type information 425 indicating the type "commercial". Hereinafter, the toner cartridge of this type will be referred to as "commercial cartridge (the normal consumable)" for the purpose of distinguishing the commercial cartridge from the subscription cartridge (the subscription consumable). The commercial cartridge may be a so-called genuine product manufactured by a manufacturer of the image forming apparatus 1, or a so-called third-party product manufactured by a third party other than the manufacturer of the image forming apparatus 1.

The printed sheet number 426 (the lifetime information, the consumption information) is information indicating the number of sheets printed in the image forming apparatus 1 since the toner cartridge 4 is attached to the image forming apparatus 1.

The developing roller-rotation number 427 (the lifetime information, the consumption information) is information indicating the number of rotations of the developing roller 41 occurred in the toner cartridge 4 in association with execution of printing since the toner cartridge 4 is attached to the image forming apparatus 1.

The remaining toner quantity 428 (the lifetime information, the remaining quantity information) is information indicating the remaining quantity of toner in the toner cartridge 4. In one example, the remaining toner quantity 428 may be constituted by a value corresponding to a plurality of levels from full to empty. For example, the remaining toner quantity 428 may be represented by a character string such as "FULL" to "EMPTY", may be a numerical value such as "100%" to "0%", or may be information combining a character string a numerical value.

An initial value of the remaining toner quantity 428 corresponds to the full quantity of the capacity set in the capacity information 422. For example, as the toner is consumed during use, a sensor (not illustrated) may optically measure the toner cartridge 4. The controller 61 may write the remaining quantity of toner obtained by the above measurement to the toner memory 42 as the remaining toner quantity 428.

In another example, the controller 61 may monitor a consumption toner quantity which is a quantity of toner ejected from the toner cartridge 4 and consumed, and may calculate the remaining quantity of toner on the basis of the capacity information 422 stored in the toner memory 42 and the monitored consumption toner quantity. The controller 61 may write the calculated remaining quantity of toner to the toner memory 42 as the remaining toner quantity 428.

The recycle number 429 (the initialization information) is information indicating the number of times that at least a part of the information stored in the toner memory 42 of the toner cartridge 4 was initialized in accordance with the user's instruction (the initialization number). In the present embodiment, initialization of information in the toner memory 42 based on the user's instruction is performed once for each recycling. Therefore, "the number of times that the toner memory 42 was initialized" described above indicates the number of times that the toner cartridge 4 was recycled. In a case where the recycle number 429 indicates a value less than 1, the recycle number 429 indicates that the toner cartridge 4 has never been recycled. In a case where the recycle number 429 indicates a value equal to or more than 1, the recycle number 429 indicates that the toner cartridge 4 is a recycled cartridge.

(Drum Cartridge Information)

Figure 6:
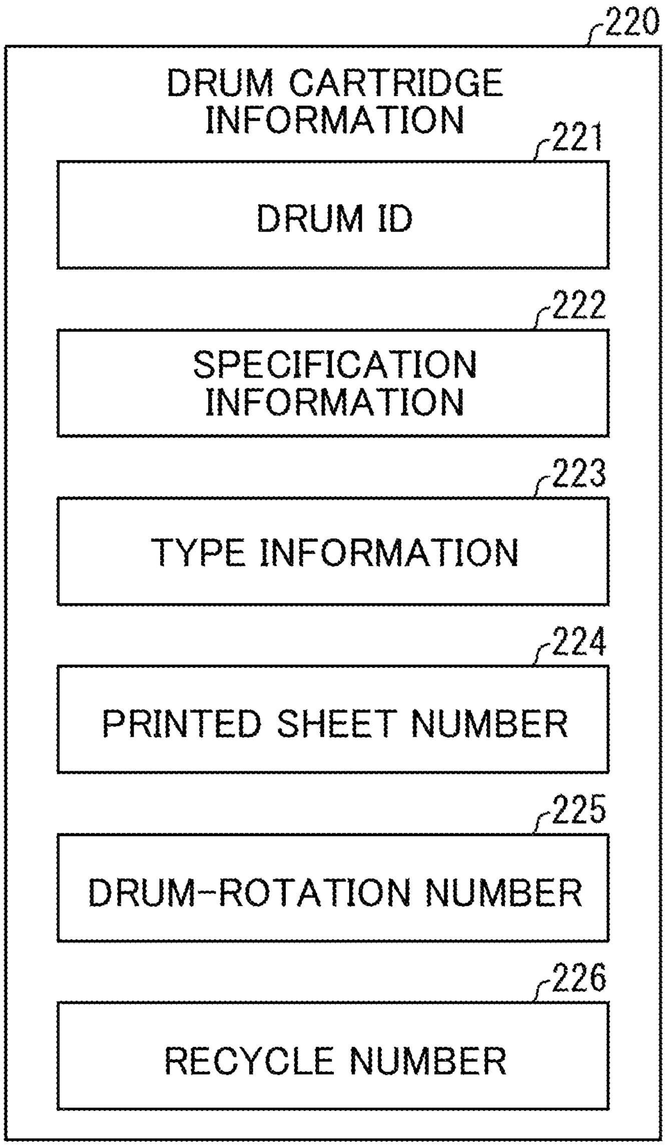
FIG. 6 is a diagram illustrating one example of a data structure of drum cartridge information stored in a drum memory.

FIG. 6 is a diagram illustrating one example of the data structure of the drum cartridge information 220 stored in the drum memory 22. The drum cartridge information 220 includes, for example, a drum ID 221, specification information 222, type information 223, lifetime information, and initialization information.

The drum cartridge information 220 of the drum cartridge 20 includes, as examples of the lifetime information, a printed sheet number 224, and a drum-rotation number 225. Similar to the toner cartridge 4, the initialization information is, for example, a recycle number 226.

The various information described above are merely examples of the drum cartridge information 220. Any other information may be added, or a part of the various information described above may be appropriately omitted depending on the environments or the circumstance in which the image formation system 100 is constructed.

The drum ID 221 is identification information for uniquely identifying the drum cartridge 20. The drum ID 221 is a serial number unique to the drum cartridge 20, for example.

The specification information 222 is information indicating a specification of the drum cartridge 20. Similar to the image forming apparatus 1 and the toner cartridge 4, there are three specifications of "for EU (Europe)", "for US (United States)", and "for JP (Japan)" for the drum cartridge 20. The specification information 222 indicates one of the specifications described above.

The type information 223 is information indicating a type of the drum cartridge 20. Similar to the toner cartridge 4, at least two types of "subscription" and "commercial" can be set as the type of the drum cartridge 20. The type information 223 indicates one of the two types described above.

The printed sheet number 224 (the lifetime information, the consumption information) is information indicating the number of sheets printed in the image forming apparatus 1 since the drum cartridge 20 is attached to the image forming apparatus 1.

The drum-rotation number 225 (the lifetime information, the consumption information) is information indicating the number of rotations of the photosensitive drum 21 occurred in the drum cartridge 20 in association with execution of printing since the drum cartridge 20 is attached to the image forming apparatus 1.

The recycle number 226 (the initialization information) is information indicating the number of times that at least a part of the information stored in the drum memory 22 of the drum cartridge 20 was initialized in accordance with the user's instruction (the initialization number). Initialization of information in the drum memory 22 based on the user's instruction is performed once for each recycling. Therefore, "the number of times that the drum memory 22 was initialized" described above indicates the number of times that the drum cartridge 20 was recycled. In a case where the recycle number 226 indicates a value less than 1, the recycle number 226 indicates that the drum cartridge 20 has never been recycled. In a case where the recycle number 226 indicates a value equal to or more than 1, the recycle number 226 indicates that the drum cartridge 20 is a recycled cartridge.

Hereinafter, flow of processes executed by the controller 61 of the image forming apparatus 1 will be described with reference to flowcharts. The processes executed by the controller 61 can be broadly divided into a recycle preparation phase, and a recycled product use phase. In the recycle preparation phase, the controller 61 executes various processes required to initialize the cartridge information stored in the consumable memory. In the recycled product use phase, the controller 61 executes various processes required to use the recycled cartridge when the recycled cartridge is attached to the image forming apparatus 1.

<Process Flow of Recycle Preparation Phase>

Figure 7:
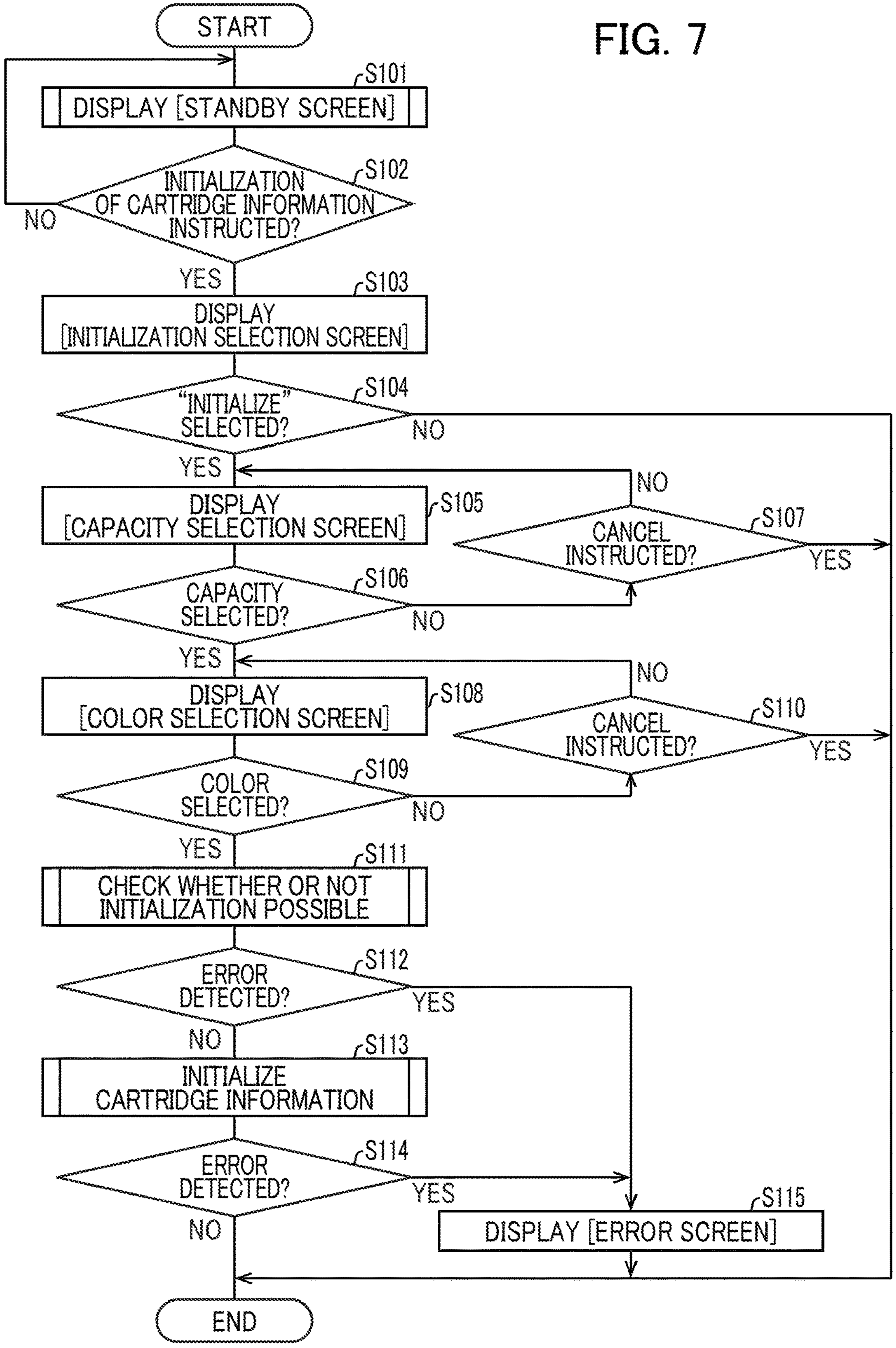
FIG. 7 is a flowchart illustrating process flow executed by the image forming apparatus in a recycle preparation phase.

FIG. 7 is a flowchart illustrating process flow executed by the image forming apparatus 1 in the recycle preparation phase. The recycle preparation phase includes a process to initialize the cartridge information stored in the consumable memory according to the user's instruction. The series of processes illustrated in FIG. 7 is executed by the controller 61. In the following description, a case where the toner cartridge 4 is recycled in the recycle preparation phase will be described in an example. Thus, initializing the toner memory 42 in a process of initialization is merely an example. The controller 61 can also execute initialization of the drum memory 22 according to the user's instruction.

In S101, the controller 61 causes the display 65 to display thereon a standby screen. The standby screen is, for example, a screen displayed while the image forming apparatus 1 is in a printing standby state. The standby screen may be displayed when a power switch of the image forming apparatus 1 is turned on, or when the image forming apparatus 1 returns from a sleep state, for example. The standby screen includes a user interface component (hereinafter referred to as "UI component") for causing the image forming apparatus 1 to execute various operations. The UI component may be constituted by a software button that the user can select by operating the operation part 64. In the present embodiment, for example, the standby screen includes a first UI component that instructs to initialize the toner cartridge information 420 stored in the toner memory 42. Note that the detailed process flow in S101 will be described later in detail with reference to another drawing.

In S102 (the reception process, the reception step), the controller 61 detects that initialization of the toner cartridge information 420 is instructed by the user. For example, the controller 61 may detect that the operation part 64 which is a hardware button indicating "determine" is pressed in a state where the first UI component in the standby screen is selected. Alternatively, the controller 61 may detect that a touch operation is performed on the first UI component through the operation part 64 formed integrally with the display 65 as a touch panel. When detecting that initialization is instructed by the user as described above, the controller 61 advances the process from YES in S102 to S103.

Although not illustrated in the drawings, when another UI component that instructs another operation is selected in the standby screen, the controller 61 advances the process from NO in S102 to a step in which an operation according to the instruction is executed.

In S103 (the first display process, the first display step), the controller 61 causes the display 65 to display thereon an initialization selection screen (the first selection screen). The initialization selection screen includes a first warning for notifying the user that a printing quality is not warranted when the toner cartridge information 420, especially the lifetime information, is initialized. The initialization selection screen further includes a second UI component for the user to select whether to initialize the toner cartridge information 420 including the lifetime information. For example, the second UI component is constituted by a button corresponding to "Initialize" indicating that the user wishes to initialize the lifetime information and a button corresponding to "Do not initialize" indicating that the user does not wish to initialize the lifetime information. The second UI component is configured to allow the user to select one of the above buttons. The selection operation by the user may be performed through either a hardware button or a software button.

In S104, the controller 61 determines which of the buttons of the second UI component was selected. When determining that the button of "Initialize" was selected, the controller 61 advances the process from YES in S104 to S105. On the other hand, when determining that the button of "Do not initialize" was selected, the controller 61 advances to NO in S104, and ends the series of processes. The controller 61 may return from NO in S104 to S101 to cause the display 65 to display thereon the standby screen.

The selection of the button of "Initialize" by the user indicates that the user wishes to initialize the toner cartridge information 420 for recycling after the user agrees with the details of the first warning. In the present embodiment, as the user agrees with the first warning, the initialization of the toner cartridge information 420 is permitted.

In S105, the controller 61 causes the display 65 to display thereon a capacity selection screen. The capacity selection screen is a screen including a UI component for the user to select the capacity of the toner cartridge 4 after recycling. For example, through the capacity selection screen, the user can select the capacity of the toner cartridge 4 after recycling from the four levels described above.

In S106, the controller 61 waits until the user selects the capacity through the capacity selection screen.

In S107, the controller 61 may receive an instruction to cancel the initialization of the toner cartridge information 420 while waiting for the selection of the capacity. When receiving the instruction of cancelling described above while the capacity is not selected, the controller 61 advances from NO in S106 to YES in S107, and ends the series of processes.

When receiving the selection of the capacity, the controller 61 temporarily stores the selected capacity in the main memory 62, and advances the process from YES in S106 to S108.

In a case where the capacity of the toner cartridge 4 is fixed, that is, in a case where the capacity of the toner cartridge 4 cannot be changed each time the recycling is performed, S105 to S107 are omitted.

In S108, the controller 61 causes the display 65 to display thereon a color selection screen. The color selection screen is a screen including a UI component for the user to select the color of toner filled in the toner cartridge 4 after recycling. For example, through the color selection screen, the user can select the color of the toner cartridge 4 after recycling from the four colors described above.

In S109, the controller 61 waits until the user selects the color through the color selection screen.

In S110, the controller 61 may receive an instruction to cancel the initialization of the toner cartridge information 420 while waiting for the selection of the color. When receiving the instruction of cancelling descried above while the color is not selected, the controller 61 advances from NO in S109 to YES in S110, and ends the series of processes.

When receiving the selection of the color, the controller 61 temporarily stores the selected color in the main memory 62, and advances the process from YES in S109 to S111.

When the color of the toner cartridge 4 is fixed, that is, when the color of the toner filled in the toner cartridge 4 cannot be changed each time the recycling is performed, S108 to S110 are omitted.

The controller 61 may execute S105 to S107 after executing S108 to S110.

In S111, the controller 61 checks whether or not the initialization of the toner cartridge information 420 is possible. Specifically, the controller 61 communicates with the toner cartridge 4 to read the latest toner cartridge information 420 at this point, and checks whether or not the toner cartridge 4 satisfies requirements for recycling. The initialization of the toner cartridge information 420 is permitted when the toner cartridge 4 satisfies the requirements for recycling. Note that the detailed process flow in S111 will be described later in detail with reference to another drawing.

In S112, the controller 61 determines whether or not any error was detected in the course of the check in S111 described above. When no error was detected, the controller 61 determines that the initialization of the toner cartridge information 420 is possible and advances the process from NO in S112 to S113. On the other hand, when any error was detected, the controller 61 determines that the initialization of the toner cartridge information 420 is not possible and advances the process from YES in S112 to S115.

In S113 (the initialization process, the initialization step), the controller 61 initializes the toner cartridge information 420 stored in the toner memory 42. The initialization process to initialize the toner cartridge information 420 may include setting of the lifetime information (for example, the printed sheet number 426 and the developing roller-rotation number 427, etc.) to 0. Further, the initialization process may include rewriting of the lifetime information (for example, the remaining toner quantity 428) to an initial value (specifically, a FULL value of the selected capacity).

In S113, in addition to the above initialization process, the controller 61 may further execute a process to change the capacity information 422 and the color information 423 to the capacity and the color selected by the user, respectively. The controller 61 may further execute a process to increment the recycle number 429 by 1 (the write process, the write step). Note that the detailed process flow in S113 will be described later in detail with reference to another drawing.

In S114, the controller 61 determines whether any error was detected in the course of the initialization in S113 described above. When no error was detected, the controller 61 determines that the initialization of the toner cartridge information 420 was successful, advances to NO in S114, and ends the series of processes. After successfully executing the initialization, the controller 61 may cause the display 65 to display thereon an initialization success screen for notifying the user that the initialization was successful. On the other hand, when any error was detected, the controller 61 determines that the initialization of the toner cartridge information 420 failed and advances the process from YES in S114 to S115.

In S115, the controller 61 causes the display 65 to display thereon an error screen for notifying the user that the toner cartridge information 420 is not initialized. The controller 61 may differentiate displayed contents between a first error screen displayed triggering the determination of YES in S112 and a second error screen displayed triggering the determination of YES in S114. For example, the first error screen may include a message notifying that the initialization is not possible since the toner cartridge 4 does not satisfy the requirements for recycling. Further, for example, the second error screen may include a message notifying that a writing operation to the toner memory 42 was not normally completed and a message prompting the user to check an attachment state of the toner cartridge 4.

(Process to Display Standby Screen)

Figure 8:
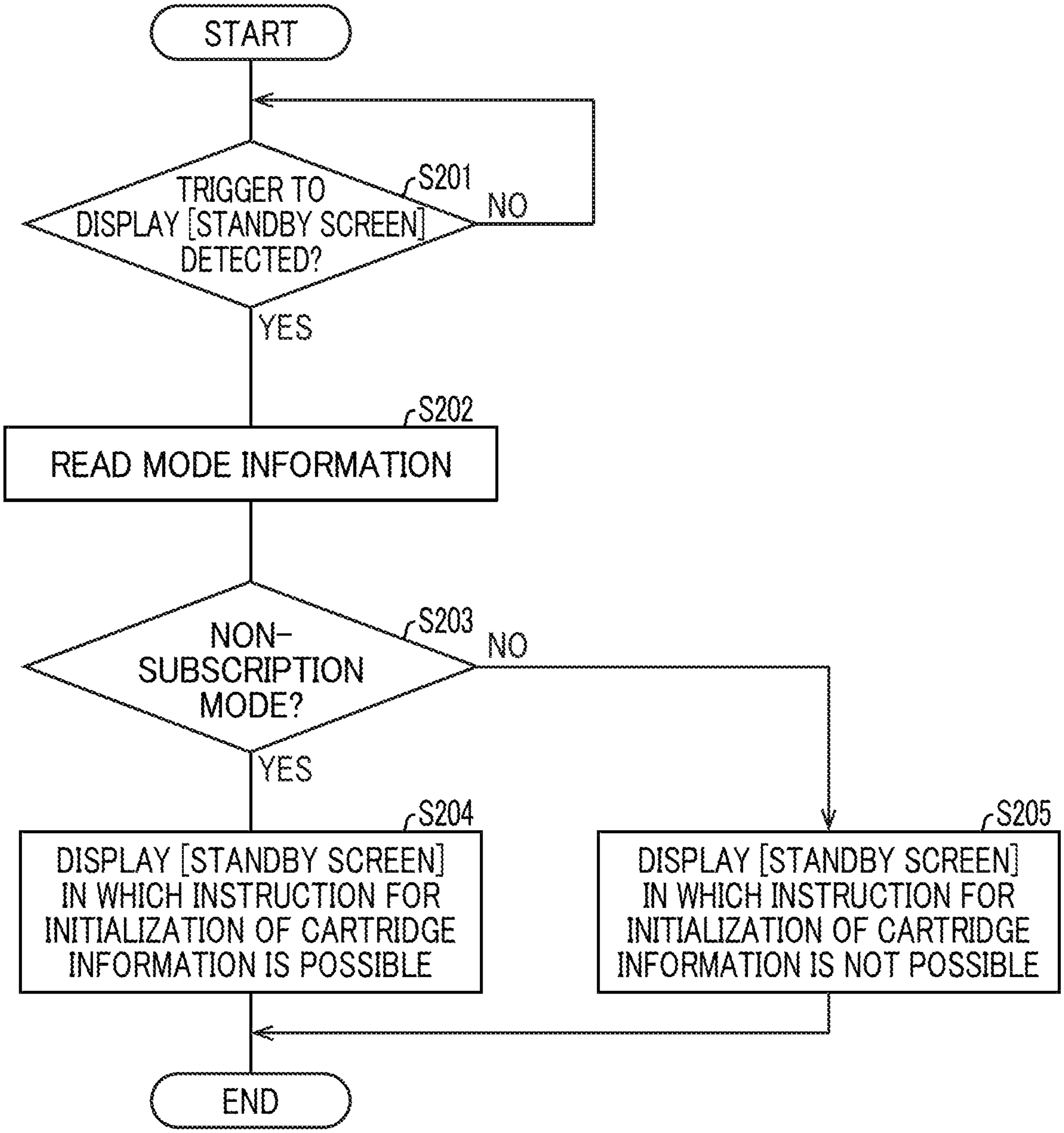
FIG. 8 is a flowchart illustrating process flow to display a standby screen.

FIG. 8 is a flowchart illustrating process flow to display the standby screen that corresponds to S101 illustrated in FIG. 7.

In S201, the controller 61 detects an event (for example, turning on of the power switch) that serves as a trigger of the process to display the standby screen. When detecting the trigger, the controller 61 advances the process from YES in S201 to S202.

In S202, the controller 61 reads the mode information 623 stored in the main memory 62. The mode information 623 is information indicating whether the image forming apparatus 1 is in the subscription mode or the non-subscription mode. That is, whether or not the image forming apparatus 1 is the contracted machine is identified by the mode information 623.

In S203, the controller 61 determines whether the mode information 623 indicates the subscription mode or the non-subscription mode. When the mode information 623 indicates the non-subscription mode, that is, when the image forming apparatus 1 is not the contracted machine, the controller 61 advances the process from YES in S203 to S204. When the mode information 623 indicates the subscription mode, that is, when the image forming apparatus 1 is the contracted machine, the controller 61 advances the process from NO in S203 to S205.

In S204, the controller 61 causes the display 65 to display thereon the standby screen so that the cartridge information can be initialized using the image forming apparatus 1 which is not the contracted machine. Specifically, the controller 61 causes the display 65 to display thereon a standby screen permitting the user to select a menu button for instructing initialization of the cartridge information (for example, the first UI component for instructing initialization of the toner cartridge information 420).

In S205, the controller 61 causes the display 65 to display thereon the standby screen so that the initialization of the cartridge information using the image forming apparatus 1 which is the contracted machine cannot be performed. Specifically, the controller 61 causes the display 65 to display thereon a standby screen in which a menu button for instructing the initialization of the cartridge information is not displayed or the menu button is displayed but selection of the menu button is not permitted. That is, in the contracted machine, the controller 61 is configured not to receive the instruction for the initialization.

With the above method, in the image forming apparatus 1 which is not the contracted machine, the consumable memory can be initialized simply, thereby contributing to promotion of the recycling. On the other hand, in the contracted machine, use of the recycled cartridge as the subscription cartridge is prevented. This operation can avoid a situation where a printing quality is not warranted in the image forming apparatus 1 for which an agreement is concluded. That is, an added value of the subscription service that warrants the printing quality is not impaired.

(Process to Check Whether or Not Initialization is Possible)

Figure 9:
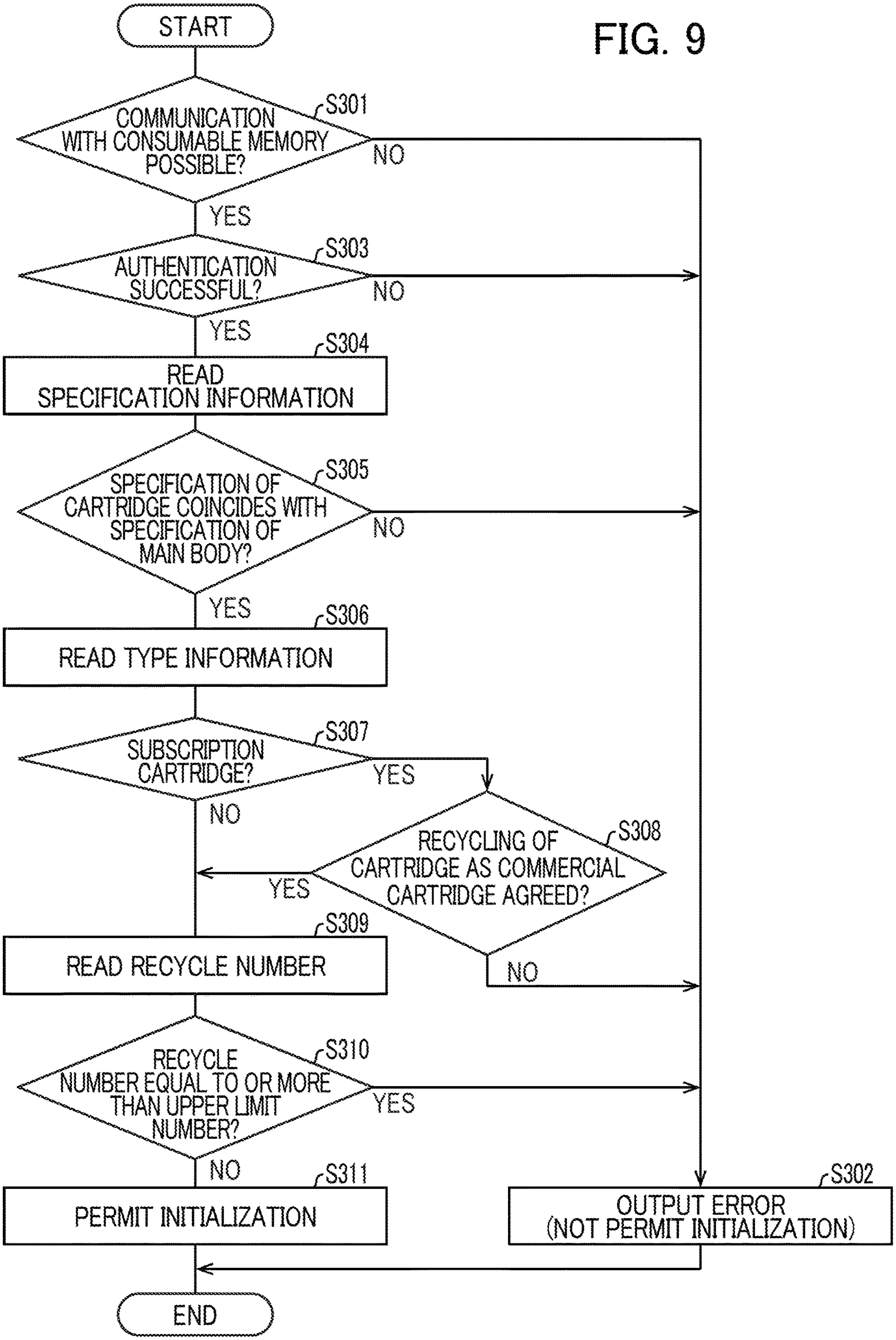
FIG. 9 is a flowchart illustrating process flow to check whether initialization is possible.

FIG. 9 is a flowchart illustrating process flow to check whether or not the initialization is possible that corresponds to S111 illustrated in FIG. 7.

In S301, the controller 61 attempts to communicate with the consumable memory, for example, the toner memory 42. When determining that communication with the toner memory 42 is not possible, for example, information in the toner memory 42 cannot be read, the controller 61 advances the process from NO in S301 to S302. On the other hand, when determining that communication with the toner memory 42 is possible, the controller 61 advances the process from YES in S301 to S303.

In S302, the controller 61 outputs an error and does not permit the initialization.

In S303, the controller 61 performs authentication of the toner cartridge 4. A method of authenticating the toner cartridge 4 is not particularly limited. For example, when the model number of the toner cartridge 4 is compatible with the model number of the image forming apparatus 1, the controller 61 may determine that the authentication of the toner cartridge 4 was successful. On the other hand, when the model number of the toner cartridge 4 is not compatible with the model number of the image forming apparatus 1, the controller 61 may determine that the authentication of the toner cartridge 4 failed.

When the controller 61 can perform the authentication of the toner cartridge 4, the controller 61 advances the process from YES in S303 to S304. On the other hand, when the controller 61 cannot perform the authentication of the toner cartridge 4, the controller 61 advances the process from NO in S303 to S302. In another example, the controller 61 may omit the process of S303.

In S304, the controller 61 reads the specification information 424 from the toner memory 42.

In S305, the controller 61 determines whether the read specification information 424 coincides with the specification information 628 of the image forming apparatus 1 stored in the main memory 62. When the two pieces of specification information coincide with each other, the controller 61 advances the process from YES in S305 to S306. On the other hand, when the two pieces of specification information do not coincide with each other, the controller 61 advances the process from NO in S305 to S302. In another example, the controller 61 may omit the processes of S304 and S305.

In S306, the controller 61 reads the type information 425 from the toner memory 42.

In S307, the controller 61 determines whether the read type information indicates the type "subscription" or the type "commercial". When the type information 425 indicates the type "subscription", the controller 61 advances the process from YES in S307 to S308. When the type information 425 indicates "commercial", the controller 61 advances the process from NO in S307 to S309.

In S308 (the third display process, the third display step), the controller 61 determines whether or not the user agrees that the toner cartridge 4 which is the subscription cartridge will be recycled as a commercial cartridge.

For example, the controller 61 causes the display 65 to display thereon an initialization selection screen (the third selection screen). The initialization selection screen includes a third warning for notifying the user that, when the toner cartridge information 420 of the subscription cartridge, especially the lifetime information is initialized, thereafter the subscription cartridge is recognized as the commercial cartridge. The initialization selection screen further includes the second UI component for the user to select whether to initialize the toner cartridge information 420 including the lifetime information or not. As described above, the second UI component is constituted by the button corresponding to "Initialize" indicating that the user wishes to initialize the lifetime information and the button corresponding to "Do not initialize" indicating that the user does not wish to initialize the lifetime information. The second UI component is configured to allow the user to select one of the buttons described above. The selection operation by the user may be performed through a hardware button or a software button.

In the above example, the controller 61 determines that the user agrees with the recycling of the subscription cartridge as the commercial cartridge when the button corresponding to "Initialize" was selected. In this case, the controller 61 advances the process from YES in S308 to S309.

On the other hand, the controller 61 determines that the user does not agree when the button corresponding to "Do not initialize" was selected. In this case, the controller 61 advances the process from NO in S308 to S302.

In S309, the controller 61 reads the recycle number 429 from the toner memory 42.

In S310 (the determination process, the determination step), the controller 61 compares the read recycle number 429 (the initialization number) with the upper limit information 625 (the upper limit of the number of times) stored in the main memory 62. That is, the controller 61 checks whether or not the recycle number 429 reaches the upper limit of the number of times indicated by the upper limit information 625. When the recycle number 429 is equal to or more than the upper limit of the number of times, the controller 61 advances the process from YES in S310 to S302. That is, the initialization of the toner cartridge information 420 beyond the upper limit of the number of times of recycling is prohibited. On the other hand, when determining that the recycle number 429 is less than the upper limit of the number of times, the controller 61 advances the process from NO in S310 to S311.

In S311, the controller 61 determines that the toner cartridge 4 satisfies the requirements for recycling, and permits the initialization of the toner cartridge information 420.

(Process to Initialize Cartridge Information)

Figure 10:
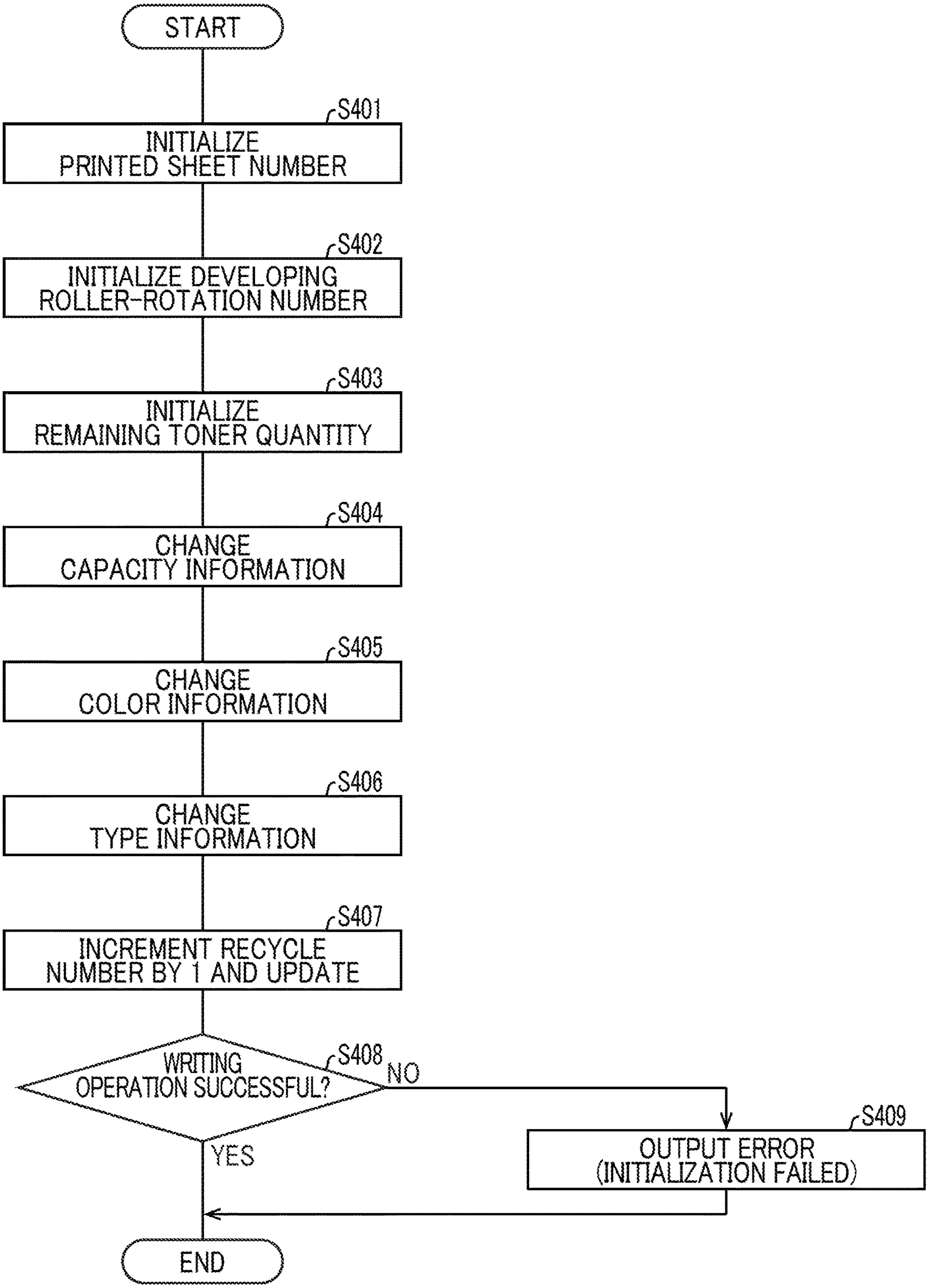
FIG. 10 is a flowchart illustrating process flow to perform initialization.

FIG. 10 is a flowchart illustrating process flow to perform the initialization that corresponds to S113 illustrated in FIG. 7.

In S401 (the initialization process, the initialization step), the controller 61 initializes the printed sheet number 426 stored in the toner memory 42. Specifically, the controller 61 sets the printed sheet number 426 counted up to a prescribed sheet number to 0. When the drum memory 22 is a target to be initialized, the controller 61 sets the printed sheet number 224 stored in the drum memory 22 to 0.

In S402 (the initialization process, the initialization step), the controller 61 initializes the developing roller-rotation number 427 stored in the toner memory 42. Specifically, the controller 61 sets the developing roller-rotation number 427 counted up to a prescribed rotation number to 0. When the drum memory 22 is the target to be initialized, the controller 61 sets the drum-rotation number 225 stored in the drum memory 22 to 0.

In S403 (the initialization process, the initialization step), the controller 61 initializes the remaining toner quantity 428 stored in the toner memory 42. Specifically, the controller 61 sets the remaining toner quantity 428 whose value is reduced during consumption of the toner to an initial value. That is, the controller 61 sets the remaining toner quantity 428 to a FULL value (a value indicating the capacity of the cartridge) of the capacity selected in S106 of FIG. 7. The FULL value corresponding to each capacity may be stored in advance in the main memory 62 or may be stored in advance in the toner memory 42.

In S404, the controller 61 changes the capacity information 422 stored in the toner memory 42. Specifically, the controller 61 rewrites the capacity information 422 so that the capacity information 422 indicates the capacity selected in S106 of FIG. 7.

In S405, the controller 61 changes the color information 423 stored in the toner memory 42. Specifically, the controller 61 rewrites the color information 423 so that the color information 423 indicates the color selected in S109 of FIG. 7.

When the drum memory 22 is the target to be initialized, S403 to S405 are omitted.

In S406 (the change process, the change step), the controller 61 changes the type information 425 stored in the toner memory 42. Specifically, the controller 61 changes the type information 425 from the "subscription" to "commercial" so that the toner cartridge 4 after recycling is recognized as the commercial cartridge, not the subscription cartridge. When the drum memory 22 is the target to be initialized, the controller 61 changes the type information 223 stored in the drum memory 22.

Note that, in the process to check illustrated in FIG. 9, the controller 61 executes the process of S406 described above when the process flow passes through YES in S308. When the process flow does not pass through YES in S308, S406 is omitted.

In S407 (the write process, the write step), the controller 61 increments the recycle number 429 stored in the toner memory 42 by 1. When the drum memory 22 is the target to be initialized, the controller 61 increments the recycle number 226 stored in the drum memory 22 by 1.

In S408, the controller 61 determines whether or not the reading operation from the toner memory 42 and the writing operation to the toner memory 42 were successful. When all of the reading operation and the writing operation were successful, the controller 61 advances to YES in S408, and ends the series of processes to perform the initialization. On the other hand, when the reading operation or the writing operation failed in any of the steps described above, the controller 61 advances the process from NO in S408 to S409.

In S409, the controller 61 outputs an error since the controller 61 could not initialize the toner cartridge information 420.

<Process Flow of Recycled product Use Phase>

Figure 11:
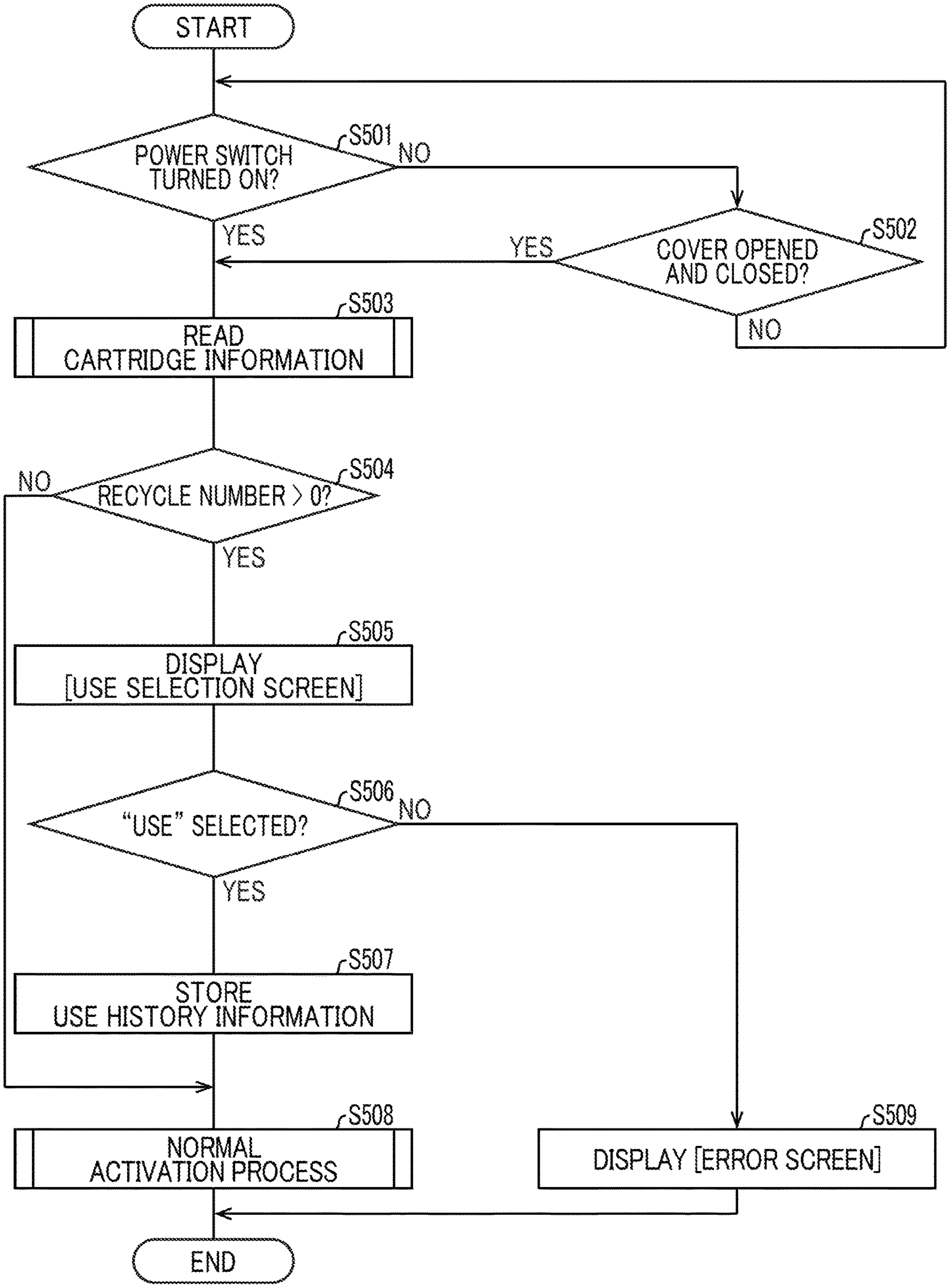
FIG. 11 is a flowchart illustrating process flow executed by the image forming apparatus in a recycled product use phase.

FIG. 11 is a flowchart illustrating process flow executed by the image forming apparatus 1 in the recycled product use phase. The series of processes illustrated in FIG. 11 is executed by the controller 61. In the following description, a case where the recycled toner cartridge 4 is used will be described in one example.

In S501, the controller 61 detects that the power switch is turned on. When the power switch is turned on, the controller 61 advances the process from YES in S501 to S503.

Otherwise, in S502, the controller 61 detects opening and closing of the cover 11. When detecting opening and closing of the cover 11, the controller 61 advances the process from YES in S502 to S503.

In S503 (the read process, the read step), the controller 61 reads the toner cartridge information 420 from the toner memory 42 of the toner cartridge 4 electrically connected thereto through the connector 102. Note that the detailed process flow in S503 will be described later in detail with reference to another drawing.

In S504 (the detection process, the detection step), the controller 61 determines whether the recycle number 429 read in S503 is more than 0. When the recycle number 429 is more than 0, for example, equal to or more than one time, the controller 61 detects that the toner cartridge 4 attached to the image forming apparatus 1 is a recycled cartridge. Then, the controller 61 advances the process from YES in S504 to S505. On the other hand, when the recycle number 429 is less than 1, for example, equal to or less than 0, the controller 61 determines that the toner cartridge 4 attached to the image forming apparatus 1 is not a recycled cartridge, and advances the process from NO in S504 to S508.

In S505 (the second display process, the second display step), the controller 61 causes the display 65 to display thereon a use selection screen (the second selection screen). The use selection screen includes a second warning for notifying the user that the printing quality is not warranted when the recycled cartridge is used as the consumable. The use selection screen further includes a third UI component for the user to select whether to use the recycled cartridge for printing. For example, the third UI component is constituted by a button corresponding to "Use" indicating that the user wishes to use the recycled cartridge and a button corresponding to "Do not use" indicating that the user does not wish to use the recycled cartridge. The third UI component is configured to allow the user to select one of the buttons described above. The selection operation by the user may be performed through a hardware button or a software button.

In S506, the controller 61 determines which one of the buttons in the third UI component was selected. When determining that the button of "Use" was selected, the controller 61 advances the process from YES in S506 to S507. On the other hand, when determining that the button of "Do not use" was selected, the controller 61 advances the process to NO in S506 to S509.

The selection of the button of "Use" by the user indicates that the user wishes to perform printing using the recycled cartridge after the user agrees with the details of the second warning. In the present embodiment, the controller 61 permits printing using the toner cartridge 4 in S506 (the permission process, the permission step) as the user agrees with the details of the second warning.

In S507 (the storage process, the storage step), the controller 61 stores, in the main memory 62, the use history information 624 indicating that the toner cartridge 4 which is the recycled cartridge is used in the image forming apparatus 1. When the use history information 624 is already stored in the main memory 62, the controller 61 may update the use history information 624.

In S508, the controller 61 activates each component in a printing mechanism of the image forming apparatus 1 to cause the image forming apparatus 1 to shift to a state where the image forming apparatus 1 can perform printing at any time.

In S509, the controller 61 causes the display 65 to display thereon an error screen. The error screen displayed in S509 may indicate a reason of the error, a solution of the error, and the like. For example, the error screen may include, as the reason of the error, a message indicating that a recycled cartridge that the user does not agree to use is attached. In one example, the error described above is assumed to be solved by turning the power switch of the image forming apparatus 1 off once and turning the same on again, or by opening and closing the cover 11. The error screen may include a message indicating the solution of the error described above.

The processes of S504 to S507 and S509 may be executed each time the power switch of the image forming apparatus 1 is turned on or each time opening and closing of the cover 11 is detected, as illustrated in the drawing.

Alternatively, the processes of S504 to S507 and S509 may be executed only once when the recycled cartridge is attached for the first time. After that, the processes of S504 to S507 and S509 may be appropriately omitted while the above recycled cartridge is kept attached instead of being detached. For example, the controller 61 can determine whether or not the attached recycled cartridge is the recycled cartridge whose use is agreed by the user by referring to the use history information 624 stored in the main memory 62. When the toner ID of the attached recycled cartridge is included in the use history information 624, the controller 61 can determine that the user already agrees with use of this recycled cartridge. Then, the controller 61 can omit the processes of S504 to S507 and S509 for the above recycled cartridge.

(Process to Read Cartridge Information)

Figure 12:
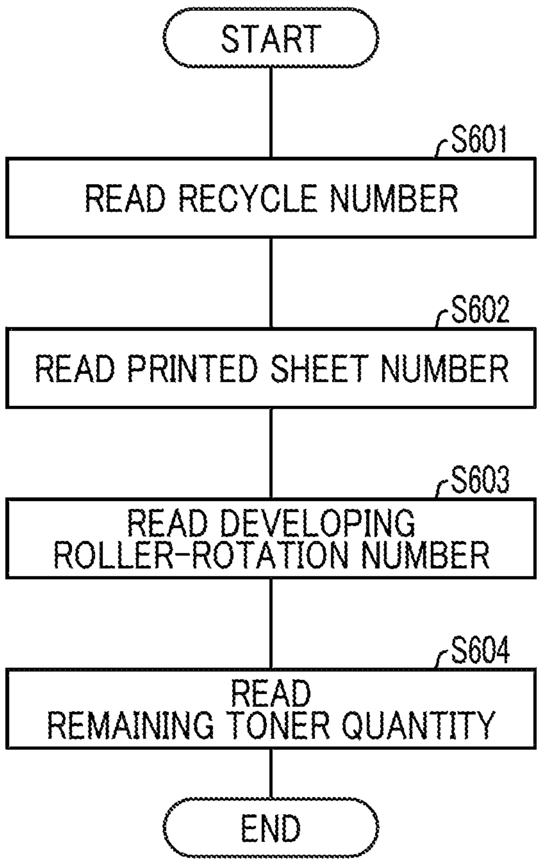
FIG. 12 is a flowchart illustrating process flow to read cartridge information.

FIG. 12 is a flowchart illustrating process flow to read the cartridge information that corresponds to S503 illustrated in FIG. 11.

In S601 (the read process, the read step), the controller 61 reads the recycle number 429 from the toner memory 42. When the recycled cartridge is the drum cartridge 20, the controller 61 reads the recycle number 226 from the drum memory 22.

In S602, the controller 61 reads the printed sheet number 426 from the toner memory 42. When the recycled cartridge is the drum cartridge 20, the controller 61 reads the printed sheet number 224 from the drum memory 22.

In S603, the controller 61 reads the developing roller-rotation number 427 from the toner memory 42. When the recycled cartridge is the drum cartridge 20, the controller 61 reads the drum-rotation number 225 from the drum memory 22.

In S604, the controller 61 reads the remaining toner quantity 428 from the toner memory 42. When the recycled cartridge is the drum cartridge 20, S604 is omitted.

The controller 61 can execute the respective steps of S601 to S604 in a desired order. Further, the controller 61 may execute a step of reading the toner ID 421 as needed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification 1

The developing roller 41 according to the first embodiment may be provided at the toner cartridge 4, or may be provided at the drum cartridge 20 as long as the developing roller 41 can achieve the functions described in the first embodiment. Further, in the first embodiment, the toner cartridge 4 is inserted into the opening part of the cartridge retaining part 13 together with the drum cartridge 20 in a state where the toner cartridge 4 is attached to the drum cartridge 20. That is, in the first embodiment, the toner cartridge 4 and the drum cartridge 20 are separated cartridges. However, the toner cartridge 4 and the drum cartridge 20 may be formed integrally as a single cartridge.

Modification 2

The image forming apparatus 1 may be an inkjet printer. In a case where the image forming apparatus 1 is an inkjet printer, an ink cartridge is attached to the cartridge retaining part 13 of the image forming apparatus 1 in place of the drum cartridge 20 and the toner cartridge 4 described in the first embodiment. Note that the number of ink cartridges attached to the image forming apparatus 1 is not particularly limited. For example, a total of four ink cartridges respectively corresponding to four colors of cyan, magenta, yellow, and black may be attached to the image forming apparatus 1, or only a single ink cartridge corresponding to the color of black may be attached to the image forming apparatus 1.

The ink cartridge includes a cartridge casing filled with ink as a printing material, and an ink memory storing therein ink cartridge information. The ink cartridge information includes, for example, an ink ID, capacity information, color information, specification information, type information, a printed sheet number (the lifetime information), a remaining ink quantity (the lifetime information), and a recycle number.

The ink ID is identification information for the ink cartridge, and is information included in the ink cartridge information in place of the toner ID 421 of the first embodiment. The remaining ink quantity is information indicating the remaining quantity of ink in the ink cartridge and is information included in the ink cartridge information in place of the remaining toner quantity 428 of the first embodiment. The capacity information, the color information, the specification information, the type information, the printed sheet number, and the recycle number are information respectively corresponding to information having the same name in the toner cartridge information 420 of the first embodiment. That is, "toner" in the toner cartridge information 420 is replaced with "ink" in these information, and "toner cartridge" is replaced with "ink cartridge".

Note that an agitator for agitating ink may be included in the cartridge casing of the ink cartridge. The agitator operates in accordance with an instruction from the controller 61 in a state where the ink cartridge is attached to the image forming apparatus 1.

Even in a case where the image forming apparatus 1 is an inkjet printer, each process flow is the same as that illustrated in the flowcharts described in the first embodiment. Specifically, in a case where the image forming apparatus 1 is an inkjet printer, "toner cartridge 4", "toner memory 42", and "toner cartridge information 420" in the first embodiment may be replaced with "ink cartridge", "ink memory", and "ink cartridge information", respectively. Further, various information included in the toner cartridge information 420 of the first embodiment may be replaced with corresponding information in the ink cartridge information. Since the developing roller-rotation number 427 is not included in the ink cartridge information, various processes relating to the developing roller-rotation number 427 may be omitted in the image forming apparatus 1 according to the present modification. The image forming apparatus 1 according to the present modification exhibits effects the same as the image forming apparatus 1 according to the first embodiment.

Modification 3

A printing material used in the image forming apparatus 1 is not limited to paper. For example, the printing material may be tape. In a case where the printing material is tape, a tape cassette that supplies tape is attached to the image forming apparatus 1, and the image forming apparatus 1 performs printing on the tape conveyed from the tape cassette. In this case, the image forming apparatus 1 may be a laser printer or an inkjet printer.

Modification 4

The image forming apparatus 1 may be an MFP (Multi-function Printer) also having other functions such as a scanning or a facsimile function. In a case where the image forming apparatus 1 is an MFP, the image forming apparatus 1 can execute various processes described in the first embodiment similar to the image forming apparatus 1 in the first embodiment. The image forming apparatus 1 according to the present modification exhibits effects the same as the image forming apparatus 1 in the first embodiment.

[Implementation Through Software]

The functions of the image forming apparatus 1 can be implemented by a program for causing a computer to function as the image forming apparatus 1 and causing the computer to function as each control block of the image forming apparatus 1 (particularly, the controller 61).

In this case, the image forming apparatus 1 includes a computer possessing at least one controller (for example, a processor) and at least one storage device (for example, a memory) as a hardware required for executing the program described above. Each function described in the above first embodiment is implemented by executing the program described above using the controller and the storage device described above.

The program may be stored in one or more non-transitory computer-readable storage media. These storage media may be provided at the image forming apparatus 1 but need not be. In the latter case, the program may be supplied to the image forming apparatus 1 through any wired or wireless transmission medium.

Further, all or a part of the functions of the control blocks described above can also be implemented by logic circuits. For example, an integrated circuit in which logic circuits that function as the above control blocks are provided falls within the scope of the present disclosure. Alternatively, the functions of the control blocks described above can be implemented by a quantum computer, for example.

Further, the processes described in the above first embodiment may be executed by an AI (Artificial Intelligence). In this case, the AI may operate on the above control device or may operate on another device (for example, an edge computer, a cloud server, or the like).

Second Embodiment

Hereinafter, a second embodiment of the present disclosure will be described with reference to FIGS. 13 to 21. In one example, a case will be described where image forming apparatuses 1 are laser printers, and image formation is printing in the present embodiment. However, the image forming apparatuses 1 may be printers other than the laser printers. For example, the image forming apparatuses 1 may be inkjet printers. Note that, in FIGS. 13 to 21, structures the same as those in the first embodiment will be described using the same reference numerals as in FIGS. 1 to 12.

<<Hardware Structure of Image Forming Apparatus 1>>

Figure 13:
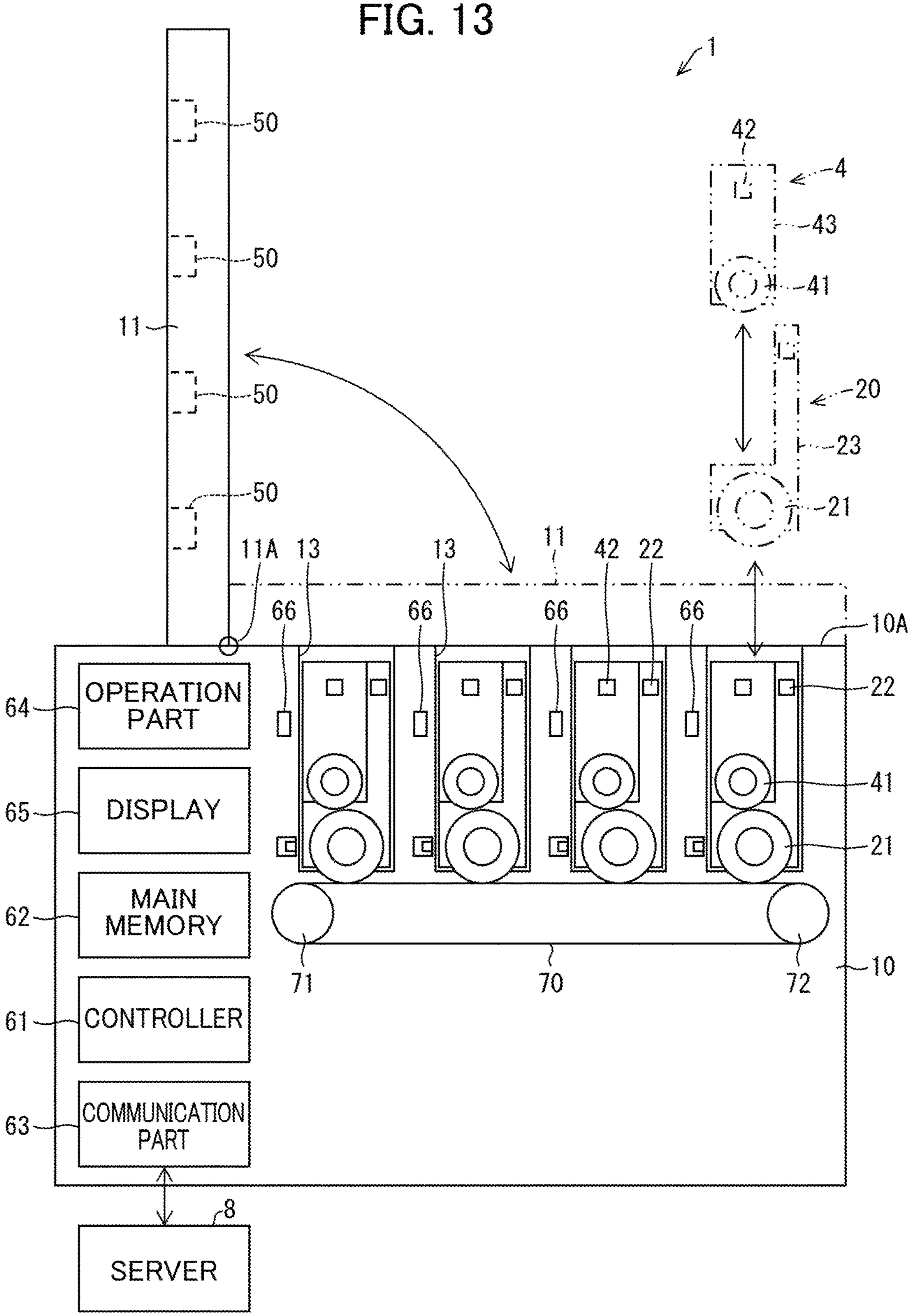
FIG. 13 is a schematic diagram of an image forming apparatus.

FIG. 13 is a schematic diagram of an image forming apparatus 1 according to the present embodiment. Note that some functions of the image forming apparatus 1 are achieved in a state where the image forming apparatus 1 performs communication connection with a server. Therefore, a server 8 that communicates with the image forming apparatus 1 is also illustrated in FIG. 13.

As illustrated in FIG. 13, the image forming apparatus 1 is configured of a main casing 10, and a cover 11. Further, toner cartridges 4 and drum cartridges 20 can be attached to the main casing 10 as replaceable components for the image forming apparatus 1. That is, the image forming apparatus 1 can include the toner cartridges 4 and the drum cartridges 20 as components thereof. Note that an external appearance of the image forming apparatus 1 illustrated in FIG. 13 is merely an example, and is not intended to limit a structure of the external appearance of the image forming apparatus 1.

(Main Casing 10)

The main casing 10 has a rectangular box-like shape, for example. The main casing 10 accommodates therein a controller 61, a main memory 62, a communication part 63, an operation part 64, a display 65, toner sensors 66 (the sensor), and a transfer belt 70.

The controller 61 is an information processing device that performs overall control of the image forming apparatus 1. The controller 61 includes an ASIC (Application Specific Integrated Circuit), for example. The controller 61 is electrically connected to the main memory 62, the communication part 63, the operation part 64, the display 65, and the toner sensors 66.

Note that the controller 61 may include a processor such as a CPU (Central Processing Unit). Further, the controller 61 may include a computer-readable storage medium that stores therein a control program. For example, the controller 61 may include a "non-transitory, tangible medium" such as a ROM (Read Only Memory), a tape, a disc, a card, a semiconductor memory, or a programmable logic circuit as the storage medium. Further, the controller 61 may employ a RAM (Random Access Memory) or the like for developing the control program.

The main memory 62 is a memory from which information is readable and to which information is writable. The main memory 62 is, for example, a flash ROM or an EEPROM (Electronically Erasable and Programmable Read Only Memory).

The communication part 63 is a communication interface between the image forming apparatus 1 and the server 8. A specific structure of the communication part 63 is not particularly limited. A communication standard between the image forming apparatus 1 and the server 8 is also not particularly limited.

The operation part 64 is an input interface for receiving a user's input operation. Various physical buttons and a touch panel are examples of the operation part 64. An input surface of the operation part 64 may be provided at an outer surface of the main casing 10 so that the user of the image forming apparatus 1 can easily perform an input operation on the input surface.

The display 65 is an output interface that can display thereon a character and/or an image. A liquid crystal display is an example of the display 65. A display surface of the display 65 may be provided at the outer surface of the main casing 10 so that the user of the image forming apparatus 1 can visually recognize displayed information easily.

Note that a plurality of operation parts 64 and a plurality of displays 65 may be provided in one image forming apparatus 1. Further, like a touch panel display, the operation part 64 and the display 65 may be integrally formed.

Each toner sensor 66 is a sensor that measures a service life of a consumable. In the present embodiment, "the service life of the consumable" indicates how much more quantity the consumable can be used, rather than an expiration date of the consumable. Note that the toner sensor 66 may be a sensor that indirectly measures the service life of the consumable. A specific structure of the toner sensor 66, and a method of measuring the service life of the consumable by the toner sensor 66 are not particularly limited. The toner sensor 66 of the present embodiment measures, as the service life of the consumable, the remaining quantity of toner filled in the toner cartridge 4. The toner sensor 66 of the present embodiment is an optical sensor, and irradiates a part of the toner cartridge 4 in which the toner is filled with light to measure reflection light. Since the remaining quantity of toner can be identified from measurement data of the reflection light, it can be said that the toner sensor 66 measures the remaining quantity of toner. After measurement, the toner sensor 66 outputs a measurement result to the controller 61.

A data format of the measurement result outputted by the toner sensor 66 is not particularly limited. In the present embodiment, it is assumed that the toner sensor 66 outputs the remaining quantity of toner identified on the basis of the measurement data of the reflection light to the controller 61. Alternatively, the toner sensor 66 may output the measurement data of the reflection light as it is to the controller 61.

The transfer belt 70 is a component for transferring developer such as toner carried on a surface of a photosensitive drum 21 onto printing paper. The transfer belt 70 is a replacement component that needs to be replaced since deterioration such as wear of a surface occurs during use. The transfer belt 70 is a belt having an annular shape (an endless belt) that can contact each photosensitive drum 21. An outer circumferential surface of each photosensitive drum 21 can contact an outer peripheral surface of the transfer belt 70. When the image forming apparatus 1 performs printing, printing paper is conveyed between the transfer belt 70 and each photosensitive drum 21.

The transfer belt 70 is looped over a drive roller 71 and a follower roller 72. The controller 61 causes the drive roller 71 to rotate, and the drive roller 71 drives the transfer belt 70. The follower roller 72 rotates following movement of the transfer belt 70 in accordance with drive of the drive roller 71.

(Attachment of Cartridge)

Cartridge retaining parts 13 for retaining the toner cartridges 4 and the drum cartridges 20 are formed in the main casing 10. Each cartridge retaining part 13 is formed as a recess and has an opening. The toner cartridge 4 and/or the drum cartridge 20 can be inserted into the opening of the cartridge retaining part 13. When the toner cartridge 4 and/or the drum cartridge 20 are/is inserted into the opening of the cartridge retaining part 13, the cartridge retaining part 13 retains the inserted toner cartridge 4 and/or drum cartridge 20, whereby attachment of the toner cartridge 4 and/or the drum cartridge 20 to the main casing 10 is completed.

In the present embodiment, the toner cartridge 4 is attachable to the drum cartridge 20. Further, in the present embodiment, the toner cartridge 4 is inserted into the opening part of the cartridge retaining part 13 together with the drum cartridge 20 in a state where the toner cartridge 4 is attached to the drum cartridge 20, as illustrated in FIG. 13. Accordingly, the toner cartridge 4 and the drum cartridge 20 are attached to the main casing 10.

Further, the image forming apparatus 1 according to the present embodiment is assumed to perform printing using four toner cartridges 4 and four drum cartridges 20. That is, in the present embodiment, four toner cartridges 4 and four drum cartridges 20 are attached to the main casing 10, as illustrated in FIG. 13. The numbers of drum cartridges 20 and toner cartridges 4 attachable to the image forming apparatus 1 are not limited to the example of FIG. 13. For example, in a case where the image forming apparatus 1 is a printer that performs monochromatic printing, the image forming apparatus 1 may be a monochromatic printer in which a single toner cartridge 4 and a single drum cartridge 20 are attachable to the main casing 10.

(Cover 11)

The cover 11 is a cover for opening and closing an opening 10A of the main casing 10. The cover 11 includes a pivot shaft 11A and light source units 50. The cover 11 is pivotally movable about the pivot shaft 11A between an open position in which the cover 11 opens the opening 10A and a closed position in which the cover 11 closes the opening 10A. That is, the cover 11 is movable between the open position and the closed position. In FIG. 13, the cover 11 positioned at the open position is indicated by a solid line, and the cover 11 positioned at the closed position is indicated by a two-dotted chain line. As illustrated in FIG. 13, the respective opening parts of the cartridge retaining parts 13 are opened in a state where the cover 11 is positioned at the open position. Further, as illustrated in FIG. 13, the respective opening parts of the cartridge retaining parts 13 are covered with the cover 11 in a state where the cover 11 is positioned at the closed position.

The pivot shaft 11A of the cover 11 extends in a first direction. The first direction is a direction in which a rotation center axis (in other words, a developing axis) of a developing roller 41 in the toner cartridge 4 extends in a state where the toner cartridge 4 is attached to the main casing 10.

Each light source unit 50 is a component for irradiating the photosensitive drum 21 of the drum cartridge 20 with light. Each light source unit 50 is provided at a position corresponding to a position of the drum cartridge 20. In the present embodiment, a total of four light source units 50 are provided such that one light source unit 50 is assigned to one drum cartridge 20.

The four light source units 50 are attached to an inner surface of the cover 11. Each light source unit 50 is disposed so as to the surface of the photosensitive drum 21 in a state where the drum cartridge 20 is attached to the main casing 10 and the opening 10A is closed (that is, the cover 11 is positioned at the closed position).

Each light source unit 50 has a plurality of light sources arranged in the first direction. Each light source can emit light to the outer circumferential surface of the photosensitive drum 21. The light source may be an LED (Light Emitting Diode), for example.

Note that a closure sensor (not illustrated) for detecting that the opening 10A is closed may be provided at the opening 10A of the main casing 10. The closure sensor is a sensor detecting that the cover 11 is positioned at the closed position. A specific structure of the closure sensor is not limited. The closure sensor may be a contact-type sensor or an optical-type sensor, for example. Alternatively, the closure sensor may be provided at the cover 11 to detect whether or not the cover 11 is positioned at the closed position. The closure sensor is electrically connected to the controller 61. A detection result of the closure sensor is outputted to the controller 61.

(Toner Cartridge 4)

Each toner cartridge 4 is one of replaceable components for the image forming apparatus 1. Each toner cartridge 4 includes a toner cartridge casing 43, the developing roller 41, and a toner memory (the consumable memory) 42.

The toner cartridge casing 43 is a casing part of the toner cartridge 4. The toner cartridge casing 43 accommodates therein the developing roller 41 and the toner memory 42. Toner can be filled into an inner part of the toner cartridge casing 43. The toner is a developer consumed when the image forming apparatus 1 performs printing. That is, the toner is a consumable for the image forming apparatus 1, and printing cannot be performed using the toner cartridge 4 that runs out of toner.

In the present embodiment, four toner cartridges 4 attached to the image forming apparatus 1 are assumed to accommodate therein toner of colors different from one another (for example, cyan, magenta, yellow, and black). However, a plurality of toner cartridges 4 filled with toner of the same color may be attachable to the image forming apparatus 1. For example, two toner cartridges 4 filled with toner of black may be attached to the image forming apparatus 1.

The toner cartridge 4 of the present embodiment is configured such that tone can be filled into the inner part of the toner cartridge casing 43 again. Even when the toner in the toner cartridge 4 is used up, the toner cartridge 4 becomes usable again by filling toner into the toner cartridge 4 again. That is, the toner cartridge 4 is a toner cartridge that can be recycled. In the following description, the toner cartridge 4 filled with toner again will also be referred to as “toner cartridge 4 of a recycled product”. The image forming apparatus 1 can use both a new toner cartridge 4 and a toner cartridge 4 of a recycled product.

Who collects the toner cartridge 4 that is used up once and refills toner into the toner cartridge 4, and how toner is refilled into the toner cartridge casing 43 are not particularly limited. For example, in the present embodiment, it is assumed that the used toner cartridge 4 is collected by a company and that toner is refilled into the toner cartridge 4 in a factory. Further, in the present embodiment, it is assumed that the company sells the toner cartridge 4 refilled with toner as a cartridge of a recycled product, and whereby the toner cartridge 4 refilled with toner is distributed.

The developing roller 41 is a hollow cylindrical member extending in the first direction, and is rotatable about its developing axis extending in the first direction. The developing roller 41 is disposed such that an outer circumferential surface of the developing roller 41 contacts the outer circumferential surface of the photosensitive drum 21 in a state where the toner cartridge 4 is attached to the drum cartridge 20.

The toner memory 42 is a memory from which information is readable and to which information is writable. A type of the toner memory 42 is not particularly limited. For example, the toner memory 42 may be a flash ROM, an EEPROM, or an IC chip.

The toner memory 42 is provided at a position in which the toner memory 42 can be electrically connected to the controller 61. For example, the toner memory 42 may be provided at either side in the first direction of an outer surface of the toner cartridge casing 43.

The toner cartridge 4 may include a toner agitator for agitating toner. The toner agitator operates in accordance with an instruction from the controller 61 in a state where the toner cartridge 4 is attached to the image forming apparatus 1.

(Drum Cartridge 20)

Each drum cartridge 20 is one of replaceable components for the image forming apparatus 1. Each drum cartridge 20 includes at least a drum cartridge casing 23 and the photosensitive drum 21.

The drum cartridge casing 23 is a casing part of the drum cartridge 20. The drum cartridge casing 23 accommodates therein the photosensitive drum 21 and a drum memory 22.

The photosensitive drum 21 is a hollow cylindrical photosensitive member extending in the first direction. The outer circumferential surface of the photosensitive drum 21 is coated with a photosensitive material. The photosensitive drum 21 is rotatable about its drum axis extending in the first direction. The image forming apparatus 1 uses the photosensitive drum 21 when performing printing. The photosensitive drum 21 is a replacement component that needs to be replaced since deterioration such as wear of the surface occurs during use. Thus, it can be said that the photosensitive drum 21 is a consumable for the image forming apparatus 1.

The drum cartridge 20 may include the drum memory 22 as illustrated in FIG. 13. The drum memory 22 is a memory from which information is readable and to which information is writable. A type of the drum memory 22 is not particularly limited. For example, the drum memory 22 may be a flash ROM, an EEPROM, or an IC chip.

The drum memory 22 is provided at a position in which the drum memory 22 can be electrically connected to the controller 61. For example, the drum memory 22 may be provided at either side in the first direction of an outer surface of the drum cartridge casing 23.

(Printing)

As illustrated in FIG. 13, the drum cartridge 20 and the toner cartridge 4 are attached to the main casing 10 in a state where the cover 11 is positioned at the open position. In the present embodiment, the drum cartridge 20 and the toner cartridge 4 are inserted into the cartridge retaining part 13 formed at the opening 10A.

Each light source unit 50 is electrically connected to the controller 61. The controller 61 causes the plurality of light sources of the light source unit 50 to emit light according to inputted image data. Each light source emits light toward the outer circumferential surface of the photosensitive drum 21. As a result, the photosensitive material on the outer circumferential surface of the photosensitive drum 21 is exposed to light according to the image data. Printing paper is conveyed between the transfer belt 70 and each photosensitive drum 21 by the movement of the transfer belt 70. The transfer belt 70 transfers toner carried on the surface of each photosensitive drum 21 to the printing paper.

<<Software Structure of Image Forming Apparatus 1>>

Figure 14:
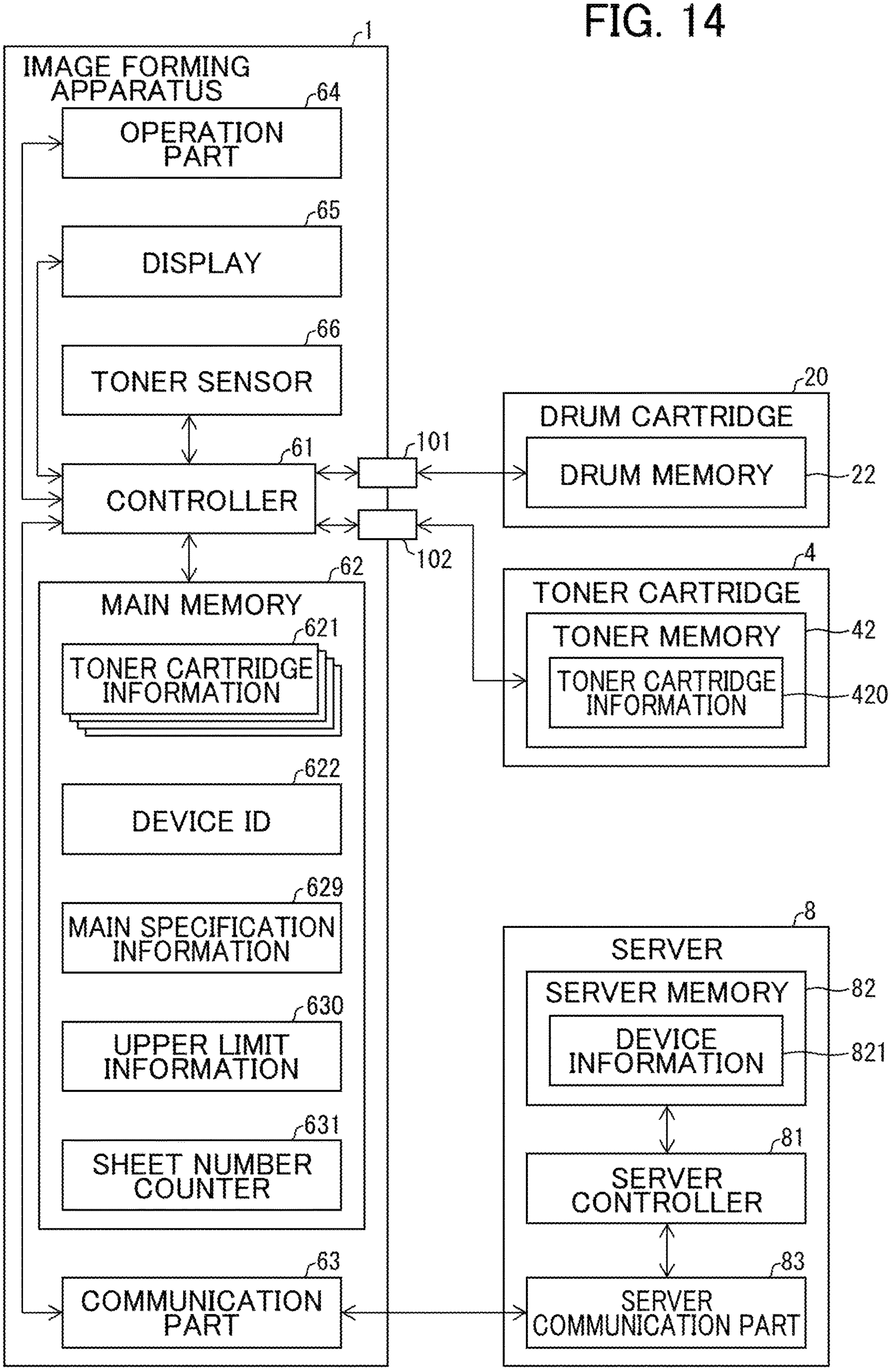
FIG. 14 is a block diagram illustrating a functional block in the image forming apparatus.

FIG. 14 is a block diagram illustrating a functional block of the image forming apparatus 1. Some functions of the image forming apparatus 1 are implemented in a state where the image forming apparatus 1 performs communication connection to the server 8. Thus, the server 8 and a functional block included in the server 8 are also illustrated in FIG. 14.

As illustrated in FIG. 14, the image forming apparatus 1 includes a connector 101 and a connector 102. The connector 101 is electrically connected to the drum memory 22 of the drum cartridge 20 inserted into the cartridge retaining part 13 illustrated in FIG. 13. In a state where the connector 101 and the drum memory 22 are electrically connected to each other, the controller 61 can communicate with the drum memory 22. That is, in this state, the controller 61 can execute writing and rewriting of information to the drum memory 22 and reading of information from the drum memory 22.

(Controller 61)

The controller 61 performs overall control of the image forming apparatus 1. For example, the controller 61 performs writing of information to the main memory 62 and reading of information from the main memory 62. Further, the controller 61 identifies contents of an input operation performed on the operation part 64, and executes a process according to the contents of the input operation, for example. Further, the controller 61 causes the display 65 display thereon an image read from the main memory 62 or an image generated by the controller 61 itself, for example. Further, the controller 61 outputs a measurement instruction to the toner sensor 66, for example. Further, the controller 61 acquires the measurement result from the toner sensor 66, for example. Further, the controller 61 performs data communication with the server 8 via the communication part 63, for example. Specific contents of processes executed by the controller 61 will be described later in detail using FIGS. 16 to 21.

In a case where the controller 61 includes a processor, the controller 61 reads a control program from the main memory 62 and operates in accordance with the control program. Accordingly, various processes specified by the control program are executed in the image forming apparatus 1.

(Communication Part 63)

The communication part 63 communicates with the server 8 over a communication network such as the Internet, for example. The communication part 63 transmits various data inputted from the controller 61 to the server 8, for example. Further, for example, the communication part 63 outputs various data received from the server 8 to the controller 61.

The communication part 63 may output various requests received from the server 8 to the controller 61, for example. The "request" indicates, for example, various requests, instructions, inquiries, and the like transmitted from the server 8. The communication part 63 may return a result of a process executed by the controller 61 in response to the above request to the server 8 as a "response". Further, the communication part 63 may transmit various requests inputted from the controller 61 to the server 8. The communication part 63 may receive, as a response, a result of a process executed by the server 8 in response to the above request, and may output the received response to the controller 61.

The response from the image forming apparatus 1 to the server 8 and/or the response from the server 8 to the image forming apparatus 1 may be omitted. For example, when receiving a request of "changing various settings in the image forming apparatus 1", the controller 61 changes various settings in the image forming apparatus 1 according to the received request, but may not return a notification indicating that the settings were changed to the server 8.

(Operation part 64, Display 65, and Toner Sensor 66)

The display 65 displays an image inputted from the controller 61 on the display surface. For example, the display 65 displays, on the display surface, an image of a screen (an initialization selection screen) for the user to select whether to execute initialization of the lifetime information according to an instruction from the controller 61. The operation part 64 receives the user's input operation on the input surface, and outputs information indicating contents of the input operation to the controller 61. For example, while the initialization selection screen is displayed on the display surface of the display 65 or after the initialization selection screen is displayed, the operation part 64 receives the user's input operation instructing to execute the initialization of the lifetime information, and outputs the contents of the input operation to the controller 61. When receiving an instruction from the controller 61, the toner sensor 66 measures the remaining quantity of toner. The toner sensor 66 outputs the measurement result to the controller 61. In a case where the toner sensor 66 outputs the measurement data of the reflection light as it is to the controller 61, the controller 61 identifies the remaining quantity of toner from the measurement data of the reflection light.

The controller 61 may identify various parameters on the basis of the measurement data of the reflection light or the remaining quantity of toner. For example, as to the toner cartridge 4 target to be measured, the controller 61 may identify at least one of the following parameters from the remaining quantity of toner: (1) the cumulative consumed quantity of toner; (2) the cumulative number of rotations of the developing roller 41; and (3) the cumulative number of sheets printed using the toner cartridge 4 target to be measured.

Note that a unit for the consumed quantity of toner is not particularly limited. For example, the toner sensor 66 may convert the consumed quantity of toner into the number of dots at the time of printing (a dot count). Alternatively, the toner sensor 66 may input a value of the remaining quantity of toner which is the measurement result into the controller 61, and the controller 61 may convert the remaining quantity of toner into one of (1) to (3) described above.

(Main Memory 62)

The main memory 62 stores therein toner cartridge information 621, a device ID 622, main specification information 629, upper limit information 630, and a sheet number counter 631.

The toner cartridge information 621 is information relating to the toner cartridge 4 attached to the image forming apparatus 1. In the present embodiment, the toner cartridge information 621 includes information the same as that in toner cartridge information 420. The toner cartridge information 621 is stored separately for each toner cartridge 4. In a case where a certain toner cartridge 4 is recycled is attached once again to the image forming apparatus 1, the toner cartridge information 621 before recycling and the toner cartridge information 621 after recycling are stored separately.

The device ID 622 is identification information for the image forming apparatus 1. The device ID 622 may be a serial number of the image forming apparatus, for example.

The main specification information 629 is information indicating a specification of the image forming apparatus 1. In the present specification, "specification" can indicate all kinds of specifications such as an external appearance, a material, an operation, contents of a provided service, and the like. For example, in the present embodiment, an operational specification of the image forming apparatus 1 is determined such that the image forming apparatus 1 is adapted to situations such as legal regulations and distribution styles of countries or regions to which the image forming apparatus 1 is shipped. The main specification information 629 of the present embodiment indicates one of "for EU (Europe)", "for US (United States)", and "for JP (Japan)".

The upper limit information 630 is information indicating an upper limit of the number of times that the initialization of the lifetime information of a certain toner cartridge 4 is permitted. In other words, it can be said that the upper limit information 630 indicates an upper limit of the number of times for recycling for the toner cartridge 4. For each toner cartridge 4, the controller 61 of the present embodiment cannot execute the initialization that exceeds the upper limit of the number of times indicated by the upper limit information 630. For example, when the upper limit of the number of times is 3, the controller 61 cannot execute the initialization of the fourth time for a certain toner cartridge 4.

The sheet number counter 631 indicates the cumulative number of printed sheets in the image forming apparatus 1. The sheet number counter 631 is incremented by the controller 61 each time printing is performed. The sheet number counter 631 may be initialized according to an instruction from the controller 61. Further, a value of the sheet number counter 631 may be read and transmitted to the server 8 by the controller 61 appropriately.

The main memory 62 may store therein, in addition to the various information described above, drum cartridge information which is information relating to the drum cartridge 20. Further, the main memory 62 may store therein an image displayed on the display 65. Still further, the main memory 62 may store therein a control program for implementing a method of controlling the image forming apparatus 1.

(Toner Cartridge Information 420)

The toner memory 42 stores therein the toner cartridge information 420. The toner cartridge information 420 indicates various information relating to the toner cartridge 4.

Figure 15:
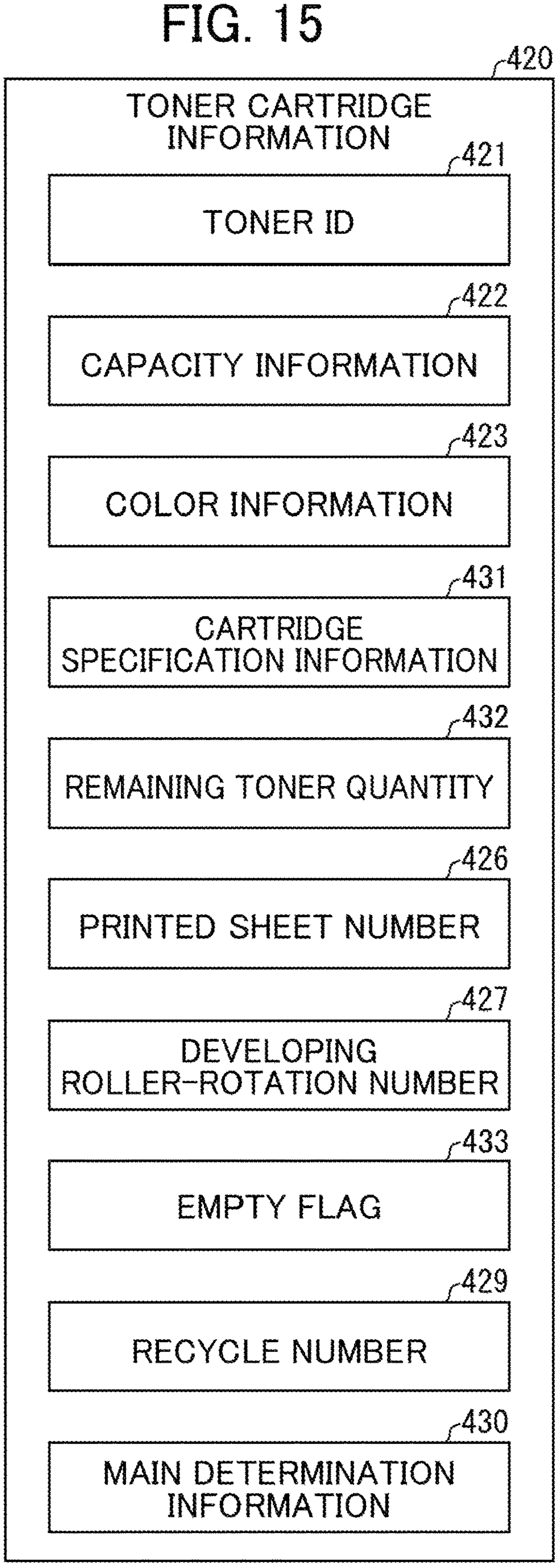
FIG. 15 is a diagram illustrating one example of a data structure of toner cartridge information.

FIG. 15 is a diagram illustrating one example of a data structure of the toner cartridge information 420. The toner cartridge information 420 includes, in one example, a toner ID 421, capacity information 422, color information 423, cartridge specification information 431, lifetime information, an empty flag 433, a recycle number 429, and main determination information 430.

The lifetime information is information relating to the service life of a consumable. For example, the lifetime information includes at least one of: consumption information for identifying the degree to which the consumable is used; and remaining quantity information for identifying the remaining quantity of the consumable. For example, the toner cartridge information 420 of the present embodiment includes, as examples of the consumption information, a printed sheet number 426 and a developing roller-rotation number 427. Further, the toner cartridge information 420 of the present embodiment includes, as an example of the remaining quantity information, a remaining toner quantity 432. In addition, the toner cartridge information 420 may include, as the consumption information, a value of a dot count and the like.

The toner ID 421 is identification information for uniquely identifying the toner cartridge 4. The toner ID 421 is a serial number unique to the toner cartridge 4, for example. The toner ID 421 may include information indicating a model number of the toner cartridge 4.

The capacity information 422 is information indicating a setting of a capacity of the consumable in the toner cartridge 4. That is, the capacity information 422 is information indicating the quantity of toner that can be filled into the toner cartridge casing 43 of the toner cartridge 4. For example, in the present embodiment, the capacity of the toner cartridge 4 is classified into four levels of "small capacity", "standard capacity", "large capacity", and "extra-large capacity" in the ascending order. The capacity information 422 of the toner cartridge information 420 indicates a capacity of one of the four levels described above.

The color information 423 is information indicating a color of toner accommodated in the toner cartridge 4. In the present embodiment, the color of toner is assumed to be one of four colors of "C (cyan)", "M (magenta)", "Y (yellow)", and "BK (black)", for example. That is, the color information 423 indicates a color of one of the four colors described above.

The cartridge specification information 431 is information indicating a specification of the toner cartridge 4. In the present embodiment, similar to the main body of the image forming apparatus 1, an operational specification of the toner cartridge 4 is determined so that the toner cartridge 4 is adapted to situations such as legal regulations and distribution styles of countries or regions to which the toner cartridge 4 is shipped. Similar to the image forming apparatus 1, the toner cartridge 4 of the present embodiment is manufactured with one of the following specifications: "for EU (Europe)"; "for US (United States)"; and "for JP (Japan)". The cartridge specification information 431 indicates a specification of one of the specifications described above.

The remaining toner quantity 432 is information indicating the remaining quantity of toner filled in the toner cartridge 4. The remaining toner quantity 432 may be constituted by a value corresponding to a plurality of states from a state in which the cartridge casing of the toner cartridge 4 is full to a state in which the cartridge casing is empty, for example. For example, the remaining toner quantity 432 may be indicated by a character string such as "FULL" to "EMPTY", and the like, by a numerical value such as "100%" to "0%", and the like, or by combining a character string and a numerical value.

Note that "full state" in the present specification may indicate a state in which the cartridge casing of the toner cartridge 4 is physically full of toner, or a state in which the quantity of toner remaining in the cartridge casing satisfies the capacity specified by the capacity information 422. Further, "empty state" in the present specification may indicate a state in which the cartridge casing of the toner cartridge 4 is physically empty, or a state in which the quantity of toner remaining in the cartridge casing is less than a threshold value specified by the capacity information 422. The threshold value in this case may be, for example, a lower limit value of the remaining quantity of toner allowing the image forming apparatus 1 to normally perform printing.

The printed sheet number 426 is information indicating the number of sheets printed in the image forming apparatus 1 since the toner cartridge 4 is attached to the image forming apparatus 1. The developing roller-rotation number 427 is information indicating the number of rotations of the developing roller 41 occurred in the toner cartridge 4 in association with execution of printing since the toner cartridge 4 is attached to the image forming apparatus 1.

The empty flag 433 is a flag indicating whether or not the toner cartridge 4 is in the empty state. In the present embodiment, the empty flag 433 is indicated by a value of 0 or 1. The present embodiment assumes that the toner cartridge 4 is in the empty state when the empty flag 433 is 1, and the toner cartridge 4 is not in the empty state when the empty flag 433 is 0.

The recycle number 429 indicates the number of times that the lifetime information of the toner memory 42 was initialized. More specifically, the recycle number 429 is information indicating the number of times that at least a part of the information stored in the toner memory 42 of the toner cartridge 4 was initialized according to the user's instruction.

The main determination information 430 indicates the identification information of the image forming apparatus 1 to which the toner cartridge 4 is attached at a time when the lifetime information is initialized or the lifetime information is updated. The main determination information 430 is stored at a time when the lifetime information is initialized or toner is consumed.

In the present embodiment, the initialization of information in the toner memory 42 based on the user's instruction is performed once for each recycling. Therefore, "the number of times of the initialization" in the toner memory 42 described above indicates the recycle number of the toner cartridge 4. When the recycle number 429 indicates a value less than 1, the recycle number 429 indicates that the toner cartridge 4 has never been recycled. When the recycle number 429 indicates a value equal to or more than 1, the recycle number 429 indicates that the toner cartridge 4 is a recycled cartridge.

The various information described above are merely examples of the toner cartridge information 420. The toner cartridge information 420 may include information other than the various information described above depending on the environment in which the image formation system 100 is constructed or the specification of the image forming apparatus 1. Further, a part of the various information described above of the toner cartridge information 420 may be appropriately omitted. Further, the drum memory 22 may store therein drum cartridge information which is information relating to the drum cartridge 20.

(Server 8)

The server 8 includes a server communication part 83, a server memory 82, and a server controller 81. The server communication part 83 is a communication interface that conducts communications between the server 8 and the image forming apparatus 1. The server communication part 83 transmits a request inputted from the server controller 81 to the image forming apparatus 1. The server communication part 83 receives a response transmitted from the image forming apparatus 1 in response to the transmitted request, and outputs the response to the server controller 81.

The server memory 82 is a storage device that stores therein data required for an operation of the server 8. The server memory 82 stores therein device information 821 for each image forming apparatus 1. The device information 821 may include, for example, a device ID, main specification information, a model number of the image forming apparatus 1, a date of manufacture of the image forming apparatus 1, and the like. In a case where the server 8 receives the printed sheet number from the image forming apparatus 1, the device information 821 may include information indicating the printed sheet number.

The server controller 81 is a CPU that performs overall control of the server 8. The server controller 81 generates a request for the image forming apparatus 1 at a prescribed timing, and outputs the generated request to the server communication part 83. Further, on the basis of a response received from the image forming apparatus 1 via the server communication part 83, the server controller 81 newly stores the device information 821 in the server memory 82, and updates the device information 821 that is already stored in the server memory 82.

<<Process Flow in Image Forming Apparatus 1>>

Next, flow of various processes executed by the controller 61 of the image forming apparatus 1 will be described with reference to the flowcharts of FIGS. 16 to 21. The controller 61 of the image forming apparatus 1 according to the present embodiment causes the toner sensor 66 to measure the remaining quantity of toner after use each time toner is consumed. Then, on the basis of the measurement result from the toner sensor 66, the controller 61 updates the remaining toner quantity 432 stored in the toner memory 42. Thus, the remaining toner quantity 432 is updated as needed during a period from when the toner cartridge 4 starts to be used until the toner cartridge 4 becomes the empty state. Note that the toner in the toner cartridge 4 may be consumed for purposes other than printing. For example, the image forming apparatus 1 may consume the toner in the toner cartridge 4 when setting up or cleaning the toner cartridge 4 attached to the main casing 10. The controller 61 may update the lifetime information other than the remaining toner quantity 432 in accordance with consumption of the toner.

For example, when the controller 61 updates the consumption information such as the printed sheet number 426, the developing roller-rotation number 427, and a value of the dot count, the controller 61 first identifies the cumulative consumed quantity of toner. The cumulative consumed quantity of toner can be identified by subtracting the remaining quantity of toner indicated by the measurement result from the toner sensor 66 from the "quantity of toner when the capacity of the toner cartridge 4 is full" identified by the capacity information 422.

When updating the printed sheet number 426 among the consumption information, the controller 61 calculates the cumulative number of printed sheets by dividing the cumulative consumed quantity of toner by a prescribed value. Here, the "prescribed value" is a quantity of toner estimated to be used for performing printing on one printing paper. The controller 61 updates the printed sheet number 426 with the calculated cumulative value. When updating the developing roller-rotation number 427 among the consumption information, the controller 61 calculates the cumulative number of rotations of the developing roller 41 by dividing the cumulative consumed quantity of toner by a consumed quantity of toner per rotation of the developing roller 41. The controller 61 updates the developing roller-rotation number 427 with the calculated cumulative value. When updating the value of the dot count among the consumption information, the controller 61 calculates the cumulative value of the dot count by dividing the consumed quantity of toner by a consumed quantity of toner per one dot. The controller 61 updates the value of the dot count in the toner memory 42 with the calculated cumulative value.

As described above, from the measurement result of the toner sensor 66, various consumption information such as the cumulative number of printed sheets, the cumulative number of rotations of the developing roller 41, and the cumulative value of the dot count can be calculated in addition to the remaining quantity of toner. Therefore, it can be said that the toner sensor 66 indirectly measures these consumption information as information indicating the service life of the consumable.

(Flow of Empty Process)

Figure 16:
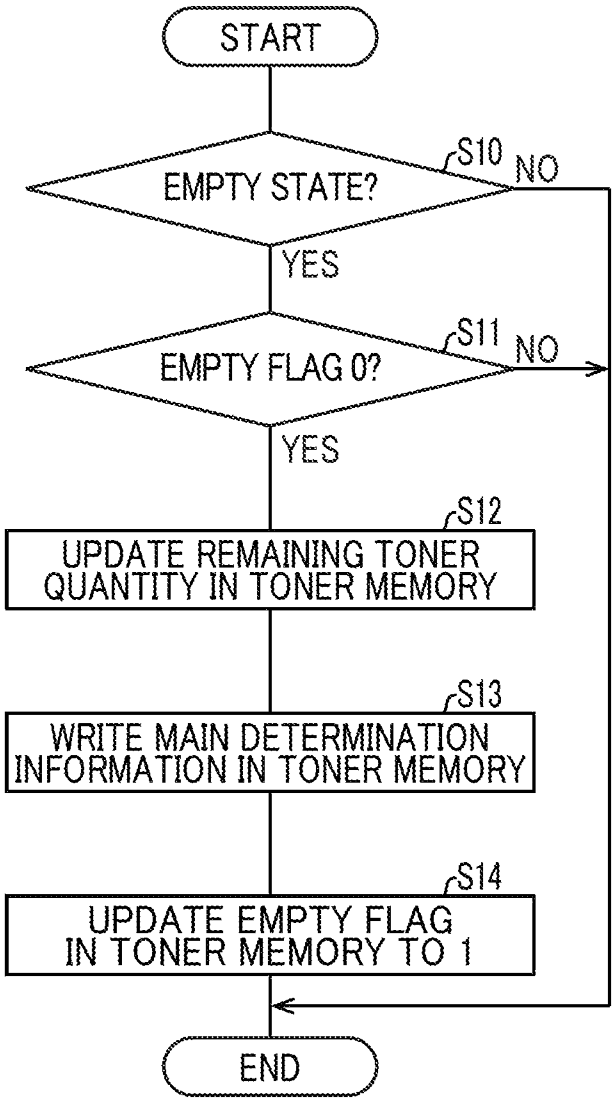
FIG. 16 is a flowchart illustrating one example of an empty process.

FIG. 16 is a flowchart illustrating one example of flow of an empty process. The empty process indicates a series of processes performed when the toner cartridge 4 becomes the empty state. The empty process illustrated in FIG. 16 can be executed when a print job in the image forming apparatus 1 is completed, or when setting up or cleaning of the toner cartridge 4 in the image forming apparatus 1 is completed. Note that, when the process illustrated FIG. 16 is performed for the toner cartridge 4, it is assumed that the process is performed individually for all of the four toner cartridges 4 attached to the image forming apparatus 1 unless otherwise specified.

In S10, the controller 61 determines whether the toner cartridge 4 is in the empty state. For example, the controller 61 causes the toner sensor 66 to measure the remaining quantity of toner, and acquires the measurement result. When the measurement result is equal to or less than a prescribed lower limit threshold value, the controller 61 determines that the toner cartridge 4 is in the empty state. When the toner cartridge 4 is in the empty state (YES in S10), the controller 61 executes S11. On the other hand, when the toner cartridge 4 is not in the empty state (NO in S10), the controller 61 does not execute the subsequent processes of S11 to S14.

In S11, the controller 61 refers to the empty flag 433 in the toner memory 42. When the empty flag 433 is 0 (YES in S11), the controller 61 executes S12. On the other hand, when the empty flag 433 is 1 (NO in S11), the controller 61 does not execute the subsequent processes of S12 to S14.

In S12, the controller 61 updates the remaining toner quantity 432 stored in the toner memory 42 to the actual measurement value of the remaining quantity of toner measured by the toner sensor 66. As a result, the remaining toner quantity 432 stored in the toner memory 42 and the remaining quantity of toner actually measured by the toner sensor 66 coincide with each other. Next, the controller 61 executes S13.

In S13, the controller 61 reads the device ID 622 from the main memory 62 and writes the read device ID 622 in the toner memory 42 as the main determination information 430. As a result, the device ID 622 of the image forming apparatus 1 to which the toner cartridge 4 is attached when the remaining toner quantity 432 is updated (S12) is stored in the toner memory 42. Note that, when the main determination information 430 is already stored in the toner memory 42 and the main determination information 430 coincides with the read device ID 622 in S13, the controller 61 need not rewrite the main determination information 430. Then, the controller 61 executes S14.

In S14, the controller 61 updates the empty flag 433 stored in the toner memory 42 from 0 to 1.

According to the above processes, the remaining toner quantity 432 of the toner memory 42 is updated in accordance with consumption of toner. As a result, the current remaining toner quantity 432 is stored in the toner memory 42.

(Flow of Process Performed when Starting Use of Recycled Product)

When the process illustrated in FIG. 16 is repeated, the toner cartridge 4 eventually becomes the empty state. That is, the toner cartridge 4 becomes a used cartridge. Thereafter, as described above, a company collects the used cartridge, refills the cartridge with toner to the full quantity, and then distributes the cartridge once again. Thus, the toner cartridge 4 as a recycled product may be distributed in a state where the toner cartridge 4 is actually filled with toner again although the remaining toner quantity 432 in the toner cartridge information 420 indicates that the toner cartridge 4 is used (i.e., in the empty state). In such a case, the toner cartridge 4 becomes usable in the image forming apparatus 1 by initializing the remaining toner quantity 432.

Figure 17:
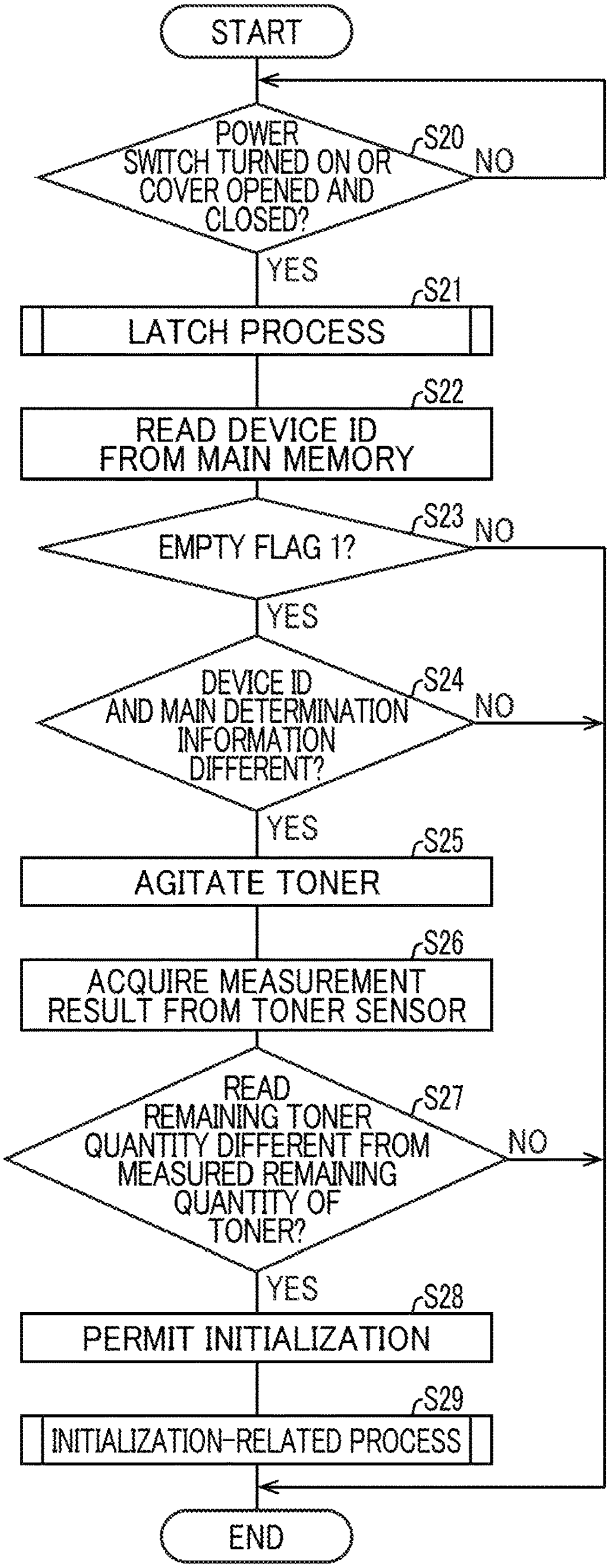
FIG. 17 is a flowchart illustrating one example of a use start process.

FIG. 17 is a flowchart illustrating one example of flow of a use start process. The "use start process" indicates a process executed when the toner cartridge 4 is newly attached to the main casing 10 and by the time when the attached toner cartridge 4 starts to be used. Note that the controller 61 of the present embodiment is assumed to monitor turning on of the power switch of the image forming apparatus 1, and opening and closing of the cover 11.

In S20, the controller 61 waits until the power switch is powered on (that is, the power switch is turned on) or the cover 11 is closed (i.e., the opening 10A is closed) (NO in S20). When the power switch is turned on or the cover 11 is closed (YES in S20), the controller 61 starts the process of S21 for each of the four toner cartridges 4 triggering the turning on of the power switch or closure of the cover 11. This operation allows the controller 61 to determine without delay whether to permit the initialization of the lifetime information. The processes following S20 are executed separately for each of the four toner cartridges 4. Accordingly, the process flow for a replaced toner cartridge 4 and the process flow for a toner cartridge 4 which is not replaced may be different from each other.

In S21, the controller 61 executes a latch process. The "latch process" in the present embodiment indicates a process to read various data included in the toner cartridge information 420 from the toner cartridge 4.

(Latch Process)

Figure 18:
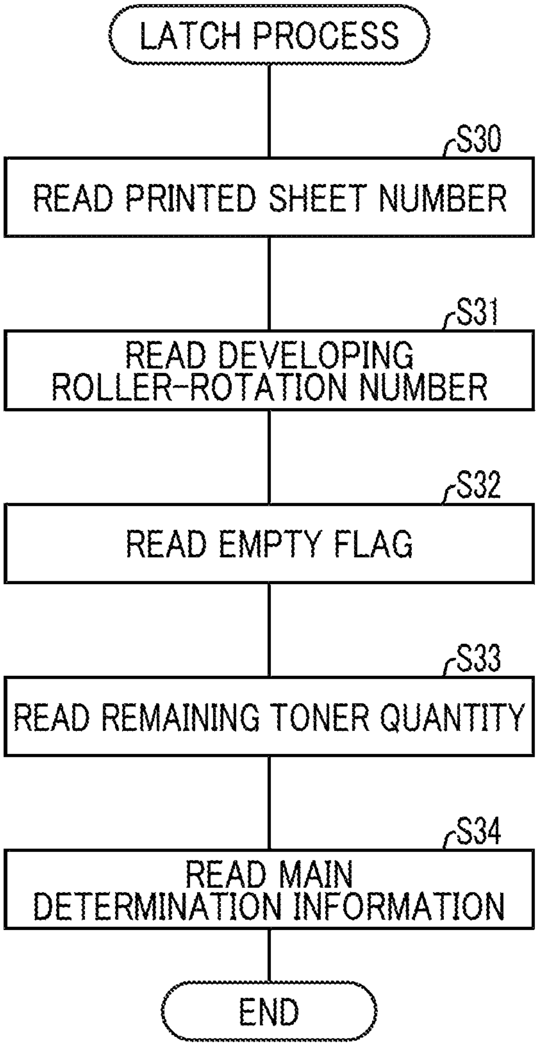
FIG. 18 is a flowchart illustrating one example of a latch process.

FIG. 18 is a flowchart illustrating one example of the latch process illustrated in S21 of FIG. 17. Note that the processes of S30 to S34 illustrated in FIG. 18 may be executed in parallel or executed in a random order. Further, the controller 61 may execute a step of reading the toner ID 421 as needed.

In S30, the controller 61 reads the printed sheet number 426 from the toner memory 42. In S31, the controller 61 reads the developing roller-rotation number 427 from the toner memory 42. In S32, the controller 61 reads the empty flag 433 from the toner memory 42. In S33, the controller 61 reads the remaining toner quantity 432 from the toner memory 42. In S34, the controller 61 reads the main determination information 430 from the toner memory 42 (the first identification information acquisition process).

After the latch process by the controller 61 is completed, the controller 61 executes the process of S22 illustrated in FIG. 17. Hereinafter, the description will be continued while referring back to FIG. 17.

In S22, the controller 61 reads the device ID 622 from the main memory 62 and acquires the same. Then, the controller 61 executes the process of S23.

In S23, the controller 61 determines whether the value of the empty flag 433 read in S32 of the latch process is 1. When the empty flag 433 is 1 (YES in S23), the controller 61 executes the process of S24. On the other hand, when the empty flag 433 is not 1 (NO in S23), the controller 61 determines that the toner cartridge 4 is not in the empty state, and ends the use start process.

In S24, the controller 61 determines whether the device ID 622 (the second identification information) and the main determination information 430 (the first identification information) are different from each other. That is, the controller 61 determines whether the identification information of the image forming apparatus 1 to which the toner cartridge 4 is currently attached is different from the identification information of the image forming apparatus to which the toner cartridge 4 is attached at a time when the toner cartridge 4 is initialized or when the toner remaining quantity 432 is updated. When the controller 61 determines that the device ID 622 and the main determination information 430 are different from each other (YES in S24), the controller 61 executes the process of S25. On the other hand, when the controller 61 determines that the device ID 622 and the main determination information 430 coincide with each other (NO in S24), the controller 61 ends the use start process.

As to the cartridge once used or whose lifetime information was initialized in a certain image forming apparatus 1, there is a low necessity of initialization of the lifetime information while the cartridge is attached to the same image forming apparatus 1. According to the process of S24, the controller 61 does not execute the process relating to permission of initialization of the lifetime information illustrated in S25 and subsequent steps when necessity of initialization of the lifetime information is low. Accordingly, the controller 61 can omit the unnecessary processes.

In S25, the controller 61 drives a toner agitator (not illustrated) included in the toner cartridge 4 to cause the toner agitator to agitate toner in the toner cartridge casing 43. This process is executed for the toner sensor 66 to more precisely measure the remaining quantity of toner in S26. After executing S25, the controller 61 executes S26.

In S26, the controller 61 instructs the toner sensor 66 to measure the remaining quantity of toner. Then, the controller 61 acquires the measurement result from the toner sensor 66. After executing S26, the controller 61 executes S27.

In S27, the controller 61 determines whether the remaining toner quantity 432 read in S33 of the latch process is different from the remaining quantity of toner measured by the toner sensor 66. When the read remaining toner quantity 432 is different from the remaining quantity of toner measured by the toner sensor 66 (YES in S27), the controller 61 executes the process of S28. On the other hand, when the read remaining toner quantity 432 coincides with the remaining quantity of toner measured by the toner sensor 66 (NO in S27), the controller 61 ends the use start process.

In S28, the controller 61 permits the initialization of the lifetime information of the toner cartridge 4 for which YES is determined in S27 (the permission process, the permission step). Information (permission information) indicating the permission to initialize the lifetime information for each toner cartridge 4 may be temporarily stored in the controller 61, or stored in the toner cartridge information 621 of the main memory 62. At a time when an initialization process to be described later is completed, the permission information is deleted or rewritten to information indicating that the initialization is not permitted.

In S29, the controller 61 executes an initialization-related process. The "initialization-related process" is a series of processes including a process to confirm the user whether to execute the initialization of the lifetime information and a process to execute the initialization of the lifetime information. Details of the initialization-related process will be described later.

When the toner cartridge 4 is filled with toner again, the actual measurement value of the remaining quantity of toner in the toner cartridge 4 and the remaining toner quantity 432 stored in the toner memory 42 differ from each other. According to the process illustrated in FIG. 17, when there is a possibility that the cartridge as the recycled product is attached, the controller 61 permits the initialization of the remaining toner quantity 432. That is, the controller 61 can permit the initialization of the lifetime information of the toner cartridge 4 in an appropriate situation.

The controller 61 may calculate, before executing the process of S27, the cumulative number of printed sheets or the cumulative number of rotations of the developing roller 41 from the remaining quantity of toner. Then, in S27, the controller 61 may determine whether the calculated cumulative number of printed sheets and the printed sheet number 426 are different from each other, or whether the calculated cumulative number of rotations and the developing roller-rotation number 427 are different from each other. In a case where a value of the dot count is included in the toner cartridge information 420, the controller 61 may determine whether the value of the dot count calculated from the actual measurement value of the remaining quantity of toner and the value of the dot count included in the toner cartridge information 420 are different from each other. Branch of the process as a result of the above determinations is the same as the case in S27 of FIG. 17.

Note that the controller 61 may execute the following modification of S27 in place of S27 illustrated in FIG. 17. In the modification of S27, the controller 61 compares the read remaining toner quantity 432 with the remaining quantity of toner measured by the toner sensor 66. Then, the controller 61 determines whether or not the measured remaining quantity of toner is larger than the remaining toner quantity 432 and whether or not a difference therebetween is equal to or more than a prescribed value. When the measured remaining quantity of toner is larger than the remaining toner quantity 432 and the difference therebetween is equal to or more than the prescribed value, the controller 61 executes the initialization-related process of S28 as in the case of YES in S27. When the measured remaining quantity of toner is smaller than the remaining toner quantity 432, or the measured remaining quantity of toner is larger than the remaining toner quantity 432 but the difference therebetween is less than the prescribed value, the controller 61 ends the use start process as in the case of NO in S27.

When the actual measurement value of the remaining quantity of toner in the toner cartridge 4 is larger than the remaining toner quantity 432, it is estimated that the toner cartridge 4 is filled with toner again. That is, it is highly likely that the toner cartridge 4 is a recycled product. According to the modification of S27 described above, when it is highly likely that the toner cartridge 4 of the recycled product is attached, the controller 61 permits the initialization of the remaining toner quantity 432. Thus, the controller 61 can permit the initialization of the lifetime information of the cartridge in a more appropriate situation.

Also in the modification of S27, the controller 61 may compare, not the remaining toner quantity 432, but the printed sheet number 426, the developing roller-rotation number 427, or the value of the dot count in the toner cartridge information 420 with a corresponding parameter calculated from the measurement result of the toner sensor 66.

When the cumulative number of printed sheets calculated by the controller 61 is a value smaller than the printed sheet number 426, and a difference therebetween is equal to or more than a prescribed value, the controller 61 executes the subsequent processes as in the case of YES in S27. Otherwise, the controller 61 ends the use start process as in the case of NO in S27.

When the cumulative number of rotations calculated by the controller 61 is a value smaller than the developing roller-rotation number 427, and a difference therebetween is equal to or more than a prescribed value, the controller 61 executes the subsequent processes as in the case of YES in S27. Otherwise, the controller 61 ends the use start process as in the case of NO in S27.

When the value of the dot count calculated by the controller 61 is a value smaller than the value of the dot count included in the toner cartridge information 420, and a difference therebetween is equal to or more than the prescribed number of times, the controller 61 executes the subsequent processes as in the case of YES in S27. Otherwise, the controller 61 ends the use start process as in the case of NO in S27.

As described above, even in a case where the consumption quantity of toner is compared and determined in S27 (or the modification in S27), there is no change in that the difference of the service life of the toner (and a length of the service life) is(are) indirectly compared and determined. Thus, even in a case where the consumption information is employed as a target to be compared, the same effects can be obtained as in the case that the process of S27 in FIG. 17 is executed.

(Initialization-Related Process)

Figure 19:
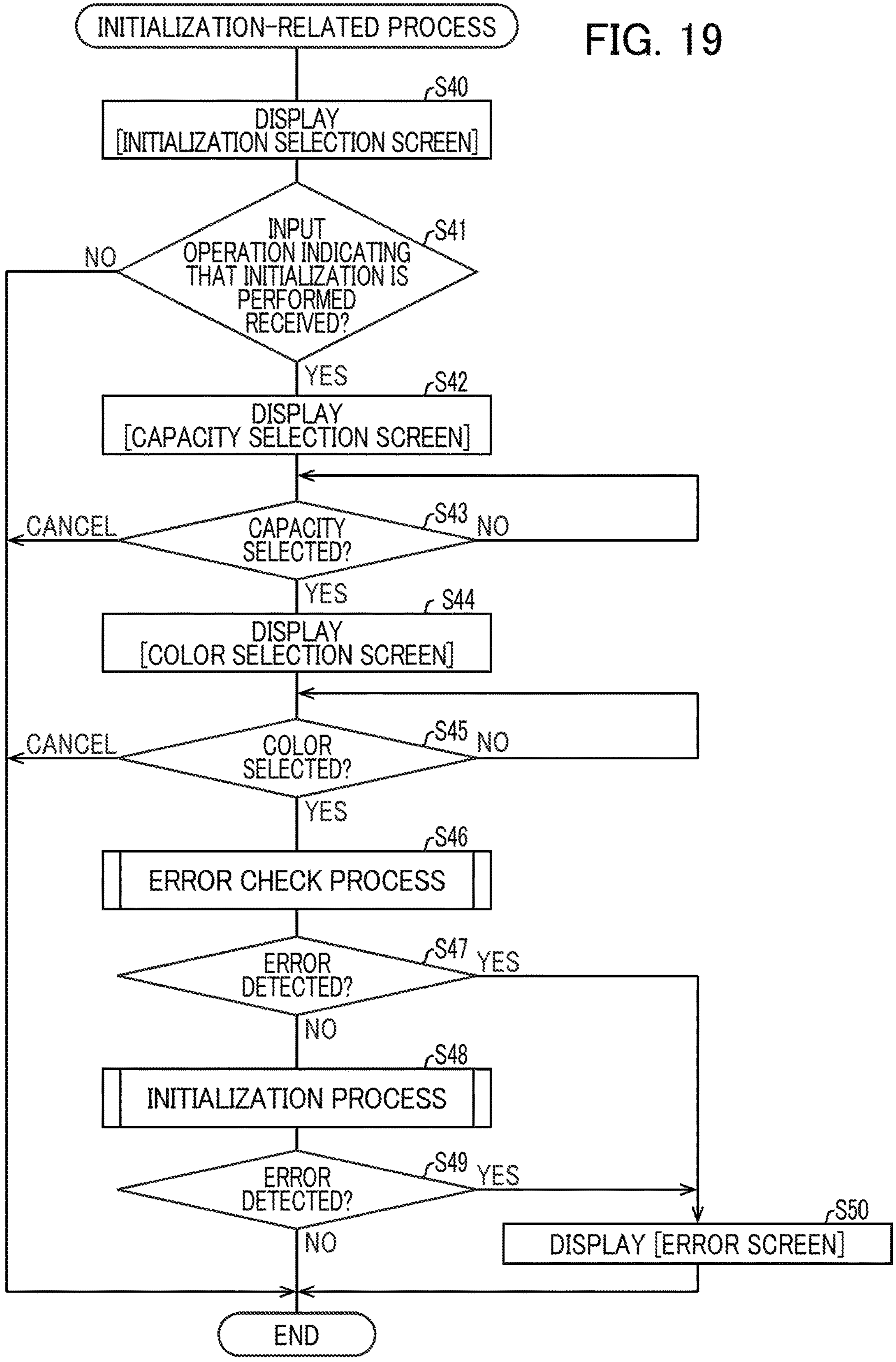
FIG. 19 is a flowchart illustrating one example of an initialization-related process.

FIG. 19 is a flowchart illustrating one example of the initialization-related process.

In S40, the controller 61 causes the display 65 to display an initialization selection screen (the selection screen display process, the selection screen display step). The initialization selection screen may include a notification indicating that the image forming apparatus 1 may not be covered by the warranty when the toner cartridge information 420 of the toner cartridge 4 is initialized. Further, the initialization selection screen may include options of whether to execute the initialization of the toner cartridge 4 or not.

While and/or after the initialization selection screen is displayed, the controller 61 waits until an input operation indicating that the initialization is to be executed or an input operation indicating that the initialization is not to be executed is performed on the operation part 64. When the controller 61 receives the input operation indicating that the initialization is to be executed (YES in S41), the controller 61 executes the process of S42. On the other hand, when the controller 61 receives the input operation indicating that the initialization is not to be executed, or when the controller 61 does not receive any input operation within a prescribed period of time (NO in S41), the controller 61 ends the initialization-related process.

The input operation performed by the user indicating that the initialization is to be executed indicates that the user wishes to initialize the toner cartridge information 420 after the user agrees with the details of the notification included in the initialization selection screen.

In S42, the controller 61 causes the display 65 to display thereon a capacity selection screen. The capacity selection screen is a screen for the user to select the capacity of the toner cartridge 4 after recycling. For example, the user can select the capacity of the toner cartridge 4 after recycling from among four levels of "small capacity", "standard capacity", "large capacity", and "extra-large capacity" by performing an input operation on the operation part 64 while referring to the capacity selection screen.

In S43, the controller 61 waits until the user selects the capacity through the operation part 64 (NO in S43). When receiving the selection of the capacity (YES in S43), the controller 61 temporarily stores the selected capacity in the main memory 62, and then executes the process of S44.

Note that the controller 61 may receive an input operation instructing to cancel the initialization of the toner cartridge information 420 through the operation part 64 during the waiting time in S43. When receiving the input operation instructing to cancel the initialization ("cancel" in S43), the controller 61 may end the initialization-related process. When the capacity of the toner cartridge 4 is fixed, that is, when the capacity of the toner cartridge 4 cannot be changed each time the recycling is performed, the processes of S42 and S43 are omitted.

In S44, the controller 61 causes the display 65 to display thereon a color selection screen. The color selection screen is a screen for the user to select the color of toner filled in the toner cartridge 4 after recycling. For example, the user can select, through the operation part 64, the color of the toner filled in the toner cartridge 4 after recycling from among four colors of "C (cyan)", "M (magenta)", "Y (yellow)", and "B (black)".

In S45, the controller 61 waits until the user selects the color through the operation part 64 (NO in S45). When receiving the selection of the color (YES in S45), the controller 61 temporarily stores the selected color in the main memory 62, and then executes the process of S46.

Note that the controller 61 may receive an input operation instructing to cancel the initialization of the toner cartridge information 420 through the operation part 64 during the waiting time in S45. When receiving the input operation instructing to cancel the initialization ("cancel" in S45), the controller 61 may end the initialization-related process. When the color of the toner cartridge 4 is fixed, that is, when the color of the toner cartridge 4 cannot be changed each time the recycling is performed, the processes of S44 and S45 are omitted.

In S46, the controller 61 executes an error check process. The "error check process" is a series of processes to check whether or not the toner cartridge information 420 satisfies requirements for the initialization. When the toner cartridge 4 satisfies the requirements for the initialization, the initialization of the toner cartridge information 420 is permitted. Details of the error check process will be described later.

In S47, the controller 61 determines whether any error was detected in the course of the check in S46 described above. When no error was detected by the controller 61 (NO in S47), the controller 61 determines that the initialization of the toner cartridge information 420 is possible, and executes the process of S48. On the other hand, when any error was detected by the controller 61 (YES in S47), the controller 61 determines that the initialization of the toner cartridge information 420 is not permitted, and executes the process of S50.

In S48, the controller 61 executes an initialization process (the initialization step). The "initialization process" is a process to initialize the lifetime information. In the present specification, the "initialization" may indicate setting of a value to 0, setting of a value to an initial value, or setting of a value to a prescribed value determined by the controller 61. In the present embodiment, the controller 61 initializes at least the remaining toner quantity 432. Details of the initialization process will be described later. In the example illustrated in FIG. 19, and FIG. 21 which describes the initialization process, it is assumed that the controller 61 also initializes the toner cartridge information 420 other than the remaining toner quantity 432 as appropriate.

In S49, the controller 61 determines whether or not any error was detected in the course of the initialization process. When no error was detected by the controller (NO in S49), the controller 61 determines that the initialization of the toner cartridge information 420 was successful, and ends the series of processes. After successfully performing the initialization process, the controller 61 may cause the display 65 to display thereon an initialization success screen for notifying the user that the initialization was successful. On the other hand, when any error was detected by the controller 61 in the course of the initialization process (YES in S49), the controller 61 determines that the initialization of the toner cartridge information 420 failed, and executes the process of S50.

In S50, the controller 61 causes the display 65 to display thereon an error screen for notifying the user that the toner cartridge information 420 is not initialized. Note that an error screen displayed with the determination of YES in S47 and an error screen displayed with the determination of YES in S49 may be different from each other. For example, the error screen displayed with the determination of YES in S47 may include a message notifying that the initialization is not possible since the toner cartridge 4 does not satisfy the requirements for recycling. Further, for example, the error screen displayed with the determination of YES in S49 may include a message notifying that the writing operation to the toner memory 42 failed and a message prompting the user to check an attachment state of the toner cartridge 4.

(Error Check Process)

Figure 20:
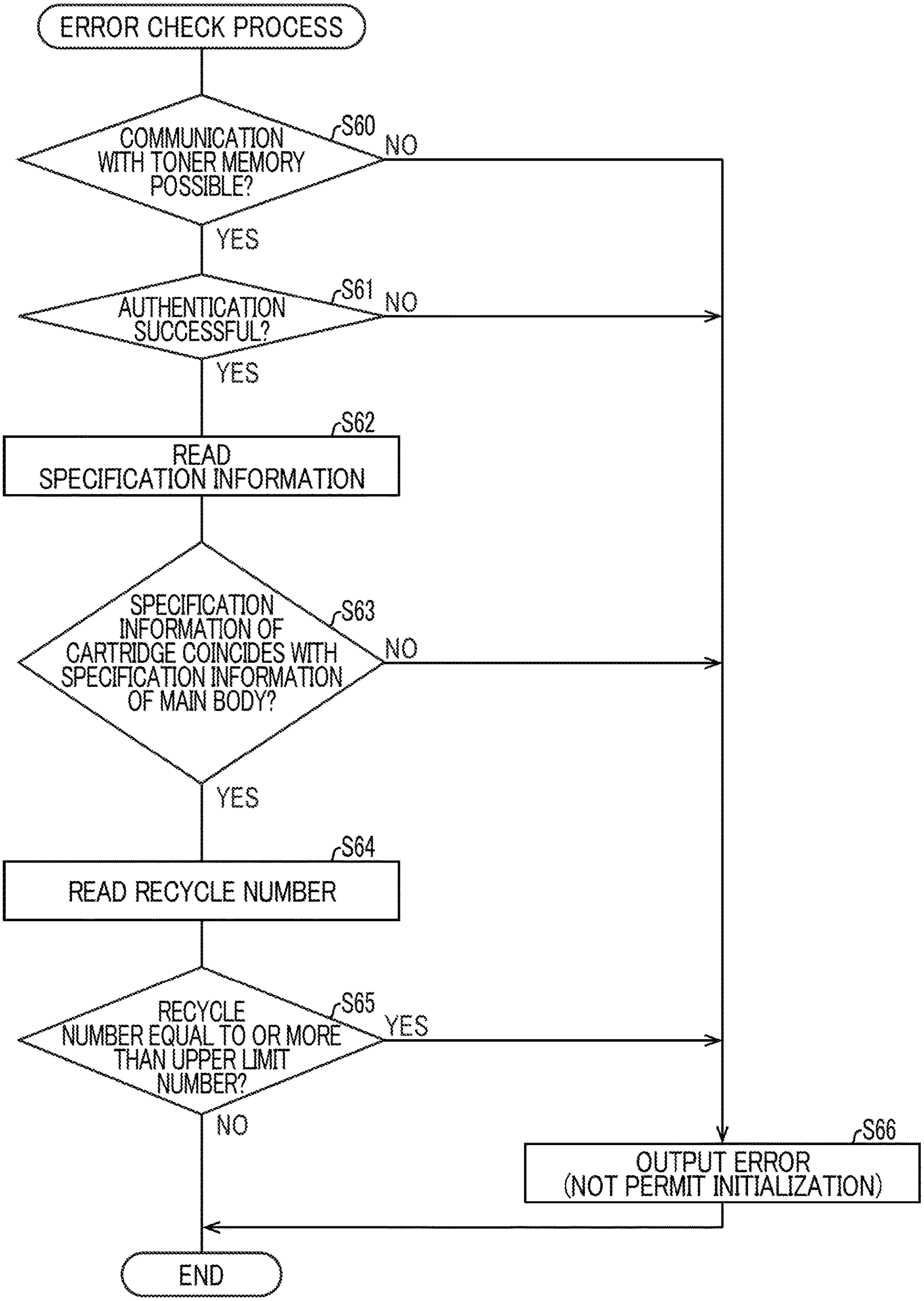
FIG. 20 is a flowchart illustrating one example of an error check process.

FIG. 20 is a flowchart illustrating one example of the error check process illustrated in S46 of FIG. 19.

In S60, the controller 61 attempts to communicate with the toner memory 42. When determining that communication with the toner memory 42 is not possible (NO in S60), the controller 61 executes the process of S66.

In S66, the controller 61 does not permit the initialization and outputs an error. Note that a mean for outputting the error and a way of outputting the error are not particularly limited. For example, the controller 61 may cause the display 65 to display thereon a notification indicating that the initialization is not permitted.

When determining that communication with the toner memory 42 is possible (YES in S60), the controller 61 executes S61.

In S61, the controller 61 performs authentication of the toner cartridge 4. A method of authenticating the toner cartridge 4 is not particularly limited. For example, when the model number of the toner cartridge 4 is compatible with the model number of the image forming apparatus 1, the controller 61 may determine that the authentication of the toner cartridge 4 was successful. On the other hand, when the model number of the toner cartridge 4 is not compatible with the model number of the image forming apparatus 1, the controller 61 may determine that the authentication of the toner cartridge 4 failed.

When the authentication of the toner cartridge 4 by the controller 61 was successful (YES in S61), the controller 61 executes the process of S62. On the other hand, when the authentication of the toner cartridge 4 by the controller 61 failed (NO in S61), the controller 61 executes the process of S66. The controller 61 may omit the process of S61.

In S62, the controller 61 reads the cartridge specification information 431 from the toner memory 42. In S63, the controller 61 determines whether the read cartridge specification information 431 coincides with the main specification information 629 stored in the main memory 62.

When the cartridge specification information 431 and the main specification information 629 coincide with each other (YES in S63), the controller 61 executes the process of S64. On the other hand, when the cartridge specification information 431 and the main specification information 629 do not coincide with each other (NO in S63), the controller 61 executes the process of S66. The controller 61 may omit the processes of S62 and S63.

In S64, the controller 61 reads the recycle number 429 from the toner memory 42. In S65, the controller 61 compares the read recycle number 429 with the upper limit information 630 stored in the main memory 62. That is, the controller 61 determines whether the recycle number 429 reaches the upper limit of the number of times indicated by the upper limit information 630.

When the recycle number 429 is equal to or more than the upper limit of the number of times (YES in S65), the controller 61 executes the process of S66. That is, the controller 61 determines that the recycle number 429 exceeds the upper limit of the number of times for recycling, and does not permit the initialization of the toner cartridge information 420. On the other hand, when the recycle number 429 is less than the upper limit of the number of times (NO in S65), the controller 61 determines that the toner cartridge 4 satisfies the requirements for recycling, and ends the error check process without any error.

(Initialization Process)

Figure 21:
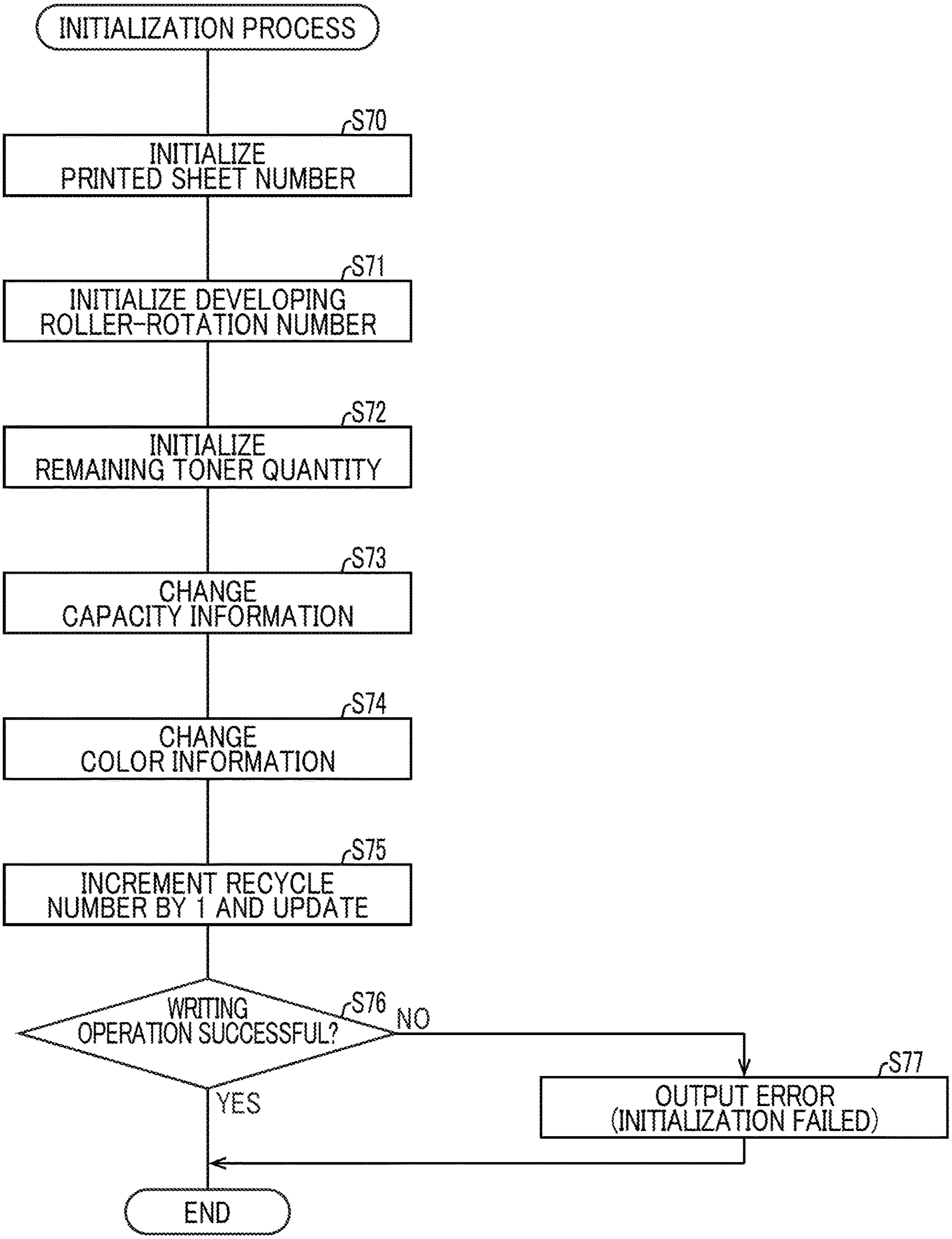
FIG. 21 is a flowchart illustrating one example of an initialization process.

FIG. 21 is a flowchart illustrating one example of the initialization process illustrated in S48 of FIG. 19. In S70, the controller 61 initializes the printed sheet number 426 stored in the toner memory 42. Specifically, the controller 61 sets the printed sheet number 426 counted up to a prescribed sheet number to 0.

In S71, the controller 61 initializes the developing roller-rotation number 427 stored in the toner memory 42. Specifically, the controller 61 sets the developing roller-rotation number 427 counted up to a prescribed rotation number to 0.

In S72, the controller 61 initializes the remaining toner quantity 432 stored in the toner memory 42.

In the present embodiment, a specific method of the initialization is not particularly limited. For example, the controller 61 may update the remaining toner quantity 432 on the basis of the remaining quantity of toner indicated by the measurement result from the toner sensor 66. More specifically, the controller 61 may write a value of the remaining quantity of toner measured by the toner sensor 66 as it is into the toner memory 42 as the remaining toner quantity 432. Through this operation, the controller 61 can initialize the remaining toner quantity 432 on the basis of actually measured remaining quantity of toner, not a prediction value. Thus, the remaining toner quantity 432 can be updated precisely.

Alternatively, the controller 61 may initialize the remaining toner quantity 432 by setting the remaining toner quantity 432 to the capacity of the toner cartridge 4 indicated by the capacity information 422 or a value indicating the full quantity in the capacity selected in S43 in FIG. 19. Note that a specific numerical value of the "value indicating the full quantity" for each capacity may be stored in advance in the main memory 62 or the toner memory 42. Accordingly, the initial value of the remaining toner quantity 432 can be set in accordance with the setting of the capacity of the toner cartridge 4. Thus, even when the setting of the capacity of the toner cartridge 4 is changed between before and after refiling of toner, i.e., before and after recycling, the remaining toner quantity 432 can be initialized to an appropriate value.

In S73, the controller 61 changes the capacity information 422 stored in the toner memory 42. Specifically, the controller 61 rewrites the capacity information 422 so that the capacity information 422 indicates the capacity selected in S43 of FIG. 19. Note that, when the capacity selected in S43 of FIG. 19 is the same as the capacity indicated by the capacity information 422, the controller 61 may omit the process of S73.

In S74, the controller 61 changes the color information 423 stored in the toner memory 42. Specifically, the controller 61 rewrites the color information 423 so that the color information 423 indicates the color selected in S45 of FIG. 19. Note that, when the color selected in S45 of FIG. 19 is the same as the color indicated by the color information 423, the controller 61 may omit the process of S74.

In S75, the controller 61 increments the recycle number 429 stored in the toner memory 42 by 1.

In S76, the controller 61 determines whether or not the writing operations to the toner memory 42 were successful. When all of the writing operations were successful (YES in S76), the controller 61 normally ends the initialization process. On the other hand, when the writing operations failed in at least any one of S70 to S75 (NO in S76), the controller 61 executes the process of S77.

In S77, the controller 61 determines that the initialization of the toner cartridge information 420 failed, and outputs an error. Note that a mean for outputting the error and a way of outputting the error are not particularly limited. For example, the controller 61 may cause the display 65 to display thereon a notification indicating that the initialization failed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification 1

The developing roller 41 according to the second embodiment may be provided at the toner cartridge 4, or may be provided at the drum cartridge 20 as long as the developing roller 41 can achieve the functions described in the second embodiment. Further, in the second embodiment, the toner cartridge 4 is inserted into the opening part of the cartridge retaining part 13 together with the drum cartridge 20 in a state where the toner cartridge 4 is attached to the drum cartridge 20. That is, in the second embodiment, the toner cartridge 4 and the drum cartridge 20 are separated cartridges. However, the toner cartridge 4 and the drum cartridge 20 may be formed integrally as a single cartridge.

Modification 2

The image forming apparatus 1 may be an inkjet printer. In a case where the image forming apparatus 1 is an inkjet printer, an ink cartridge is attached to the cartridge retaining part 13 of the image forming apparatus 1 in place of the drum cartridge 20 and the toner cartridge 4 described in the second embodiment. Note that the number of ink cartridges attached to the image forming apparatus 1 is not particularly limited. For example, a total of four ink cartridges respectively corresponding to four colors of cyan, magenta, yellow, and black may be attached to the image forming apparatus 1, or only a single ink cartridge corresponding to the color of black may be attached to the image forming apparatus 1.

The ink cartridge includes a cartridge casing filled with ink as a consumable, and an ink memory storing therein ink cartridge information. The ink cartridge information includes, an ink ID, capacity information, color information, cartridge specification information, a remaining ink quantity, a recycle number, a printed sheet number, an empty flag, and a main determination information.

The ink ID is identification information for the ink cartridge, and is information included in the ink cartridge information in place of the toner ID 421 of the second embodiment. The remaining ink quantity is information indicating the remaining quantity of ink in the ink cartridge and is information included in the ink cartridge information in place of the remaining toner quantity 432 of the second embodiment. The capacity information, the color information, the cartridge specification information, the recycle number, the printed sheet number, the empty flag, and the main determination information are information respectively corresponding to information having the same name in the toner cartridge information 420 in the second embodiment. That is, "toner" in the toner cartridge information 420 is replaced with "ink" in these information, and "toner cartridge" is replaced with "ink cartridge".

Note that an agitator for agitating ink may be included in the cartridge casing of the ink cartridge. The agitator operates in accordance with an instruction from the controller 61 in a state where the ink cartridge is attached to the image forming apparatus 1.

Even in a case where the image forming apparatus 1 is an inkjet printer, each process flow is the same as that illustrated in the flowcharts described in the second embodiment. Specifically, in a case where the image forming apparatus 1 is an inkjet printer, "toner cartridge 4", "toner memory 42", and "toner cartridge information 420" in the second embodiment may be replaced with "ink cartridge", "ink memory", and "ink cartridge information", respectively. Further, various information included in the toner cartridge information 420 of the second embodiment may be replaced with corresponding information in the ink cartridge information. Since the developing roller-rotation number 427 is not included in the ink cartridge information, various processes relating to the developing roller-rotation number 427 may be omitted in the image forming apparatus 1 according to the present modification. The image forming apparatus 1 according to the present modification exhibits effects the same as the image forming apparatus 1 according to the second embodiment.

Modification 3

A printing material used in the image forming apparatus 1 is not limited to paper. For example, the printing material may be tape. In a case where the printing material is tape, a tape cassette that supplies tape is attached to the image forming apparatus 1, and the image forming apparatus 1 performs printing on the tape conveyed from the tape cassette. In this case, the image forming apparatus 1 may be a laser printer or an inkjet printer.

Modification 4

The image forming apparatus 1 may be an MFP (Multifunction Printer) also having other functions such as a scanning or a facsimile function. In a case where the image forming apparatus 1 is an MFP, the image forming apparatus 1 can execute various processes described in the second embodiment similar to the image forming apparatus 1 in the second embodiment. The image forming apparatus 1 according to the present modification exhibits effects the same as the image forming apparatus 1 in the second embodiment.

[Implementation Through Software]

The functions of the image forming apparatus 1 can be implemented by a program for causing a computer to function as the image forming apparatus 1 and causing the computer to function as each control block of the image forming apparatus 1 (particularly, the controller 61).

In this case, the image forming apparatus 1 includes a computer possessing at least one controller (for example, a processor) and at least one storage device (for example, a memory) as a hardware required for executing the program described above. Each function described in the above second embodiment is implemented by executing the program described above using the controller and the storage device described above.

The program may be stored in one or more non-transitory computer-readable storage media. These storage media may be provided at the image forming apparatus 1 but need not be. In the latter case, the program may be supplied to the image forming apparatus 1 through any wired or wireless transmission medium. Further, all or a part of the functions of the control blocks described above can also be implemented by logic circuits. For example, an integrated circuit in which logic circuits that function as the above control blocks are provided falls within the scope of the present disclosure. Alternatively, the functions of the control blocks described above can be implemented by a quantum computer, for example. Further, the processes described in the above embodiment may be executed by an AI (Artificial Intelligence). In this case, the AI may operate on the above control device or may operate on another device (for example, an edge computer, a cloud server, or the like).

The present disclosure is not limited to the embodiments described above, and various modifications may be made thereto within the scope indicated in the claims. Embodiments obtained by appropriately combining technical means respectively disclosed in the different embodiments fall within the technical scope of the present disclosure.

What is claimed is:

1. An image forming apparatus comprising:

a main casing to which a consumable is attached;

a controller; and a main memory, wherein the consumable includes a consumable memory in which lifetime information relating to a service life of the consumable is stored, and wherein the controller is configured to perform:

a reception process to receive an instruction to initialize the lifetime information;

an initialization process to initialize the lifetime information stored in the consumable memory in accordance with the received instruction; and a write process to write initialization information into the consumable memory, the initialization information indicating that the lifetime information was initialized by execution of the initialization process.

2. The image forming apparatus according to claim 1, wherein the image forming apparatus comprises a display, and wherein the controller is configured to perform:

a display process to cause the display to display thereon a warning and a selection screen in accordance with the instruction, the warning indicating that a printing quality is not warranted when the lifetime information is initialized, the selection screen being a screen for a user to select whether to initialize the lifetime information or not; and wherein the controller performs the initialization process when initialization is selected through the selection screen.

3. The image forming apparatus according to claim 1, wherein the image forming apparatus comprises an operation part, and wherein, in the reception process, the controller receives the instruction to initialize the lifetime information through the operation part.

4. The image forming apparatus according to claim 1, wherein the initialization information is an initialization number that indicates the number of times that the lifetime information was initialized, wherein the controller is configured to further perform:

a determination process to determine whether the initialization number of the lifetime information indicated by the initialization information reaches a predetermined upper limit of the number of times, and wherein the controller is configured not to perform the initialization process when determining in the determination process that the initialization number reaches the upper limit of the number of times.

5. The image forming apparatus according to claim 1, wherein at least one of consumption information and remaining quantity information is stored in the consumable memory as the lifetime information, the consumption information being information for identifying a degree to which the consumable is used, the remaining quantity information being information for identifying a quantity of a material remaining in the consumable.

6. The image forming apparatus according to claim 5, wherein the consumable is a toner cartridge, wherein at least one of a printed sheet number, a developing roller-rotation number, and a consumption toner quantity is stored in the consumable memory as the consumption information, and wherein, in the initialization process, the controller sets a value of the consumption information to 0.

7. The image forming apparatus according to claim 5, wherein the consumable is a drum cartridge, wherein at least one of a printed sheet number and a drum-rotation number is stored in the consumable memory as the consumption information, and wherein, in the initialization process, the controller sets a value of the consumption information to 0.

8. The image forming apparatus according to claim 5, wherein the consumable is a cartridge that accommodates therein a printing material, wherein a value indicating a capacity of the cartridge is stored in the main memory or the consumable memory, wherein a remaining printing material quantity is stored in the consumable memory as the remaining quantity information, and wherein, in the initialization process, the controller rewrites a value of the remaining printing material quantity to the value indicating the capacity stored in the main memory or the consumable memory.

9. The image forming apparatus according to claim 1, wherein the image forming apparatus comprises a display, wherein the initialization information is an initialization number that indicates the number of times that the lifetime information was initialized, and wherein the controller is configured to further perform:

a read process to read the initialization number from the consumable memory of the consumable attached to the main casing;

a detection process to detect that the attached consumable is a recycled product on the basis of the read initialization number being equal to or more than one time; and a display process to cause the display to display thereon a warning and a selection screen in response to detection of the recycled product, the warning indicating that a printing quality is not warranted when the recycled product is used, the selection screen being a screen for a user to select whether to use the recycled product or not.

10. The image forming apparatus according to claim 9, wherein the controller is configured to further perform:

a permission process to permit printing using the recycled product when use is selected through the selection screen.

11. The image forming apparatus according to claim 9, wherein the controller is configured to further perform:

a storage process to store use history information in the main memory when use is selected through the selection screen, the use history information indicating that the recycled product was used.

12. The image forming apparatus according to claim 1, wherein mode information is stored in the main memory, the mode information indicating whether the image forming apparatus is in a subscription mode indicating that an agreement is reached for the image forming apparatus, and wherein the controller is configured not to perform the reception process when the mode information indicates the subscription mode.

13. The image forming apparatus according to claim 1, wherein type information is stored in the consumable memory, the type information indicating whether the consumable is a subscription consumable or a normal consumable, the subscription consumable being a consumable that can be used in an image forming apparatus for which an agreement is reached, the normal consumable being a consumable that can be used in an image forming apparatus for which an agreement is reached and in an image forming apparatus for which an agreement is not reached, and wherein the controller is configured to further perform:

a change process to change the type information to the normal consumable in accordance with the instruction when the type information indicates the subscription consumable.

14. The image forming apparatus according to claim 13, wherein the image forming apparatus comprises a display, and wherein, when the type information indicates the subscription consumable, the controller is configured to perform:

a display process to cause the display to display thereon a warning and a selection screen in accordance with the instruction, the warning indicating that the subscription consumable is recognized as the normal consumable when the lifetime information is initialized, the selection screen being a screen for a user to select whether to initialize the lifetime information or not, and wherein the controller performs the initialization process when initialization is selected through the selection screen.

15. An initialization method of initializing a consumable memory included in a consumable, the initialization method comprising:

a reception step, by an image forming apparatus, receiving an instruction to initialize lifetime information stored in the consumable memory of the consumable attached to a main casing of the image forming apparatus, the lifetime information being information relating to a service life of the consumable;

an initialization step, by the image forming apparatus, initializing the lifetime information stored in the consumable memory in accordance with the received instruction; and a write step, by the image forming apparatus, writing initialization information into the consumable memory, the initialization information indicating that the lifetime information was initialized by execution of the initialization step.

16. The image forming apparatus according to claim 1, wherein the initialization information indicates a number of times that the lifetime information was initialized.

17. The initialization method according to claim 15, further comprising:

a display step, by the image forming apparatus, causing a display of the image forming apparatus to display thereon a warning and a selection screen in accordance with the instruction, the warning indicating that a printing quality is not warranted when the lifetime information is initialized, the selection screen being a screen for a user to select whether to initialize the lifetime information or not, wherein the image forming apparatus is configured to perform the initialization step when initialization is selected through the selection screen.

18. The initialization method according to claim 15, wherein, in the reception step, the image forming apparatus receives the instruction to initialize the lifetime information through an operation part of the image forming apparatus.

19. The initialization method according to claim 15, wherein the initialization information is an initialization number that indicates the number of times that the lifetime information was initialized, the initialization method further comprising:

a determination step, by the image forming apparatus, determining whether the initialization number of the lifetime information indicated by the initialization information reaches a predetermined upper limit of the number of times, wherein the image forming apparatus is configured not to perform the initialization step when determining in the determination step that the initialization number reaches the upper limit of the number of times.

20. The initialization method according to claim 15, wherein at least one of consumption information and remaining quantity information is stored in the consumable memory as the lifetime information, the consumption information being information for identifying a degree to which the consumable is used, the remaining quantity information being information for identifying a quantity of a material remaining in the consumable.

21. The initialization method according to claim 20, wherein the consumable is a toner cartridge, wherein at least one of a printed sheet number, a developing roller-rotation number, and a consumption toner quantity is stored in the consumable memory as the consumption information, and wherein, in the initialization step, the image forming apparatus sets a value of the consumption information to 0.

22. The initialization method according to claim 20, wherein the consumable is a drum cartridge, wherein at least one of a printed sheet number and a drum-rotation number is stored in the consumable memory as the consumption information, and wherein, in the initialization step, the image forming apparatus sets a value of the consumption information to 0.

23. The initialization method according to claim 20, wherein the consumable is a cartridge that accommodates therein a printing material, wherein a value indicating a capacity of the cartridge is stored in a main memory of the image forming apparatus or the consumable memory, wherein a remaining printing material quantity is stored in the consumable memory as the remaining quantity information, and wherein, in the initialization step, the image forming apparatus rewrites a value of the remaining printing material quantity to the value indicating the capacity stored in the main memory or the consumable memory.

24. The initialization method according to claim 15, wherein the initialization information is an initialization number that indicates the number of times that the lifetime information was initialized, the initialization method further comprising:

a read step, by the image forming apparatus, reading the initialization number from the consumable memory of the consumable attached to the main casing;

a detection step, by the image forming apparatus, detecting that the attached consumable is a recycled product on the basis of the read initialization number being equal to or more than one time; and a display step, by the image forming apparatus, causing a display of the image forming apparatus to display thereon a warning and a selection screen in response to detection of the recycled product, the warning indicating that a printing quality is not warranted when the recycled product is used, the selection screen being a screen for a user to select whether to use the recycled product or not.

25. The initialization method according to claim 24, further comprising:

a permission step, by the image forming apparatus, permitting printing using the recycled product when use is selected through the selection screen.

26. The initialization method according to claim 24, further comprising:

a storage step, by the image forming apparatus, storing use history information in a main memory of the image forming apparatus when use is selected through the selection screen, the use history information indicating that the recycled product was used.

27. The initialization method according to claim 15, wherein mode information is stored in a main memory of the image forming apparatus, the mode information indicating whether the image forming apparatus is in a subscription mode indicating that an agreement is reached for the image forming apparatus, and wherein the image forming apparatus is configured not to perform the reception step when the mode information indicates the subscription mode.

28. The initialization method according to claim 15, wherein type information is stored in the consumable memory, the type information indicating whether the consumable is a subscription consumable or a normal consumable, the subscription consumable being a consumable that can be used in an image forming apparatus for which an agreement is reached, the normal consumable being a consumable that can be used in an image forming apparatus for which an agreement is reached and in an image forming apparatus for which an agreement is not reached, the initialization method further comprising:

a change step, by the image forming apparatus, changing the type information to the normal consumable in accordance with the instruction when the type information indicates the subscription consumable.

29. The initialization method according to claim 28, further comprising:

a display step, by the image forming apparatus, causing a display of the image forming apparatus to display thereon a warning and a selection screen in accordance with the instruction when the type information indicates the subscription consumable, the warning indicating that the subscription consumable is recognized as the normal consumable when the lifetime information is initialized, the selection screen being a screen for a user to select whether to initialize the lifetime information or not, wherein the image forming apparatus is configured to perform the initialization step when initialization is selected through the selection screen.

30. The initialization method according to claim 15, wherein the initialization information indicates a number of times that the lifetime information was initialized.

31. An image forming apparatus comprising:

a main casing to which a cartridge is attached;

a sensor that measures a service life of a consumable filled in the cartridge; and a controller, wherein the cartridge includes a consumable memory in which lifetime information is stored, the lifetime information being information stored when the consumable is used and indicating the service life of the consumable, and wherein the controller is configured to perform:

a permission process to permit initialization of the lifetime information by the image forming apparatus when the service life indicated by the lifetime information stored in the consumable memory is different from the service life measured by the sensor.

32. The image forming apparatus according to claim 31, wherein, in the permission process, the controller permits the initialization of the lifetime information in the image forming apparatus when the service life measured by the sensor is greater than the service life indicated by the lifetime information and a difference between the service life measured by the sensor and the service life indicated by the lifetime information is equal to or more than a prescribed value.

33. The image forming apparatus according to claim 31, wherein first identification information is stored in the consumable memory, the first identification information being identification information of the image forming apparatus to which the cartridge is attached at a time of the initialization or update of storing of the lifetime information, and wherein the controller is configured to perform:

a first identification information acquisition process to acquire the first identification information stored in the consumable memory; and the permission process when the first identification information acquired by the first identification information acquisition process is different from second identification information which is identification information of the image forming apparatus to which the cartridge is currently attached.

34. The image forming apparatus according to claim 31, wherein the image forming apparatus comprises:

a display that displays an image thereon; and an operation part that receives an input operation, and wherein the controller is configured to further perform:

a selection screen display process to cause the display to display thereon an initialization selection screen when the initialization of the lifetime information is permitted, the initialization selection screen being a screen to select whether to initialize the lifetime information or not; and an initialization process to initialize the lifetime information when receiving an input operation indicating the initialization is to be performed through the operation part after the selection screen display process.

35. The image forming apparatus according to claim 34, wherein, in the initialization process, the controller updates storing of the lifetime information on the basis of the service life measured by the sensor.

36. The image forming apparatus according to claim 34, wherein capacity information is stored in the consumable memory, the capacity information being information indicating a setting of a capacity for the consumable in the cartridge, and wherein, in the initialization process, the controller sets the lifetime information to an initial value according to the capacity indicated by the capacity information.

37. The image forming apparatus according to claim 31, wherein the image forming apparatus comprises a cover movable between an open position in which the cover opens an opening of the main casing and a closed position in which the cover closes the opening, and wherein the controller is configured to perform the permission process to trigger that a power switch of the image forming apparatus is turned on or the opening is covered by the cover.

38. A control method for an image forming apparatus to which a cartridge filled with a consumable is attached, the cartridge including a consumable memory in which lifetime information is stored, the lifetime information being information stored when the consumable is used and indicating a service life of the consumable, the control method comprising:

a permission step, by the image forming apparatus, permitting initialization of the lifetime information by the image forming apparatus when the service life indicated by the lifetime information is different from the service life measured by a sensor that measures the service life of the consumable;

a selection screen display step, by the image forming apparatus, causing a display to display thereon an initialization selection screen when the initialization of the lifetime information is permitted, the initialization selection screen being a screen to select whether to perform the initialization of the lifetime information or not; and an initialization step, by the image forming apparatus, initializing the lifetime information when receiving an input operation indicating the initialization is to be performed through an operation part after the selection screen display step.

* * * * *